US009104675B1

(12) United States Patent  
Clark et al.

(10) Patent No.: US 9,104,675 B1  
(45) Date of Patent: Aug. 11, 2015

(54) INODE TO PATHNAME SUPPORT WITH A HARD LINK DATABASE

(75) Inventors: Morgan Clark, South Orange, NJ (US); Michael D. Scheer, Summit, NJ (US); Michael D. Schouten, Lake Katrine, NY (US); Jean-Pierre Bono, Westboro, MA (US); Alexander S. Mathews, Jamesburg, NJ (US)

(73) Assignee: EMC Corporation, Hopkinton, MA (US)

( * ) Notice: Subject to any disclaimer, the term of this patent is extended or adjusted under 35 U.S.C. 154(b) by 425 days.

(21) Appl. No.: 13/461,316

(22) Filed: May 1, 2012

(51) Int. Cl.  
*G06F 17/30* (2006.01)

(52) U.S. Cl.  
CPC .... *G06F 17/30067* (2013.01); *G06F 17/30091* (2013.01)

(58) Field of Classification Search  
CPC ............... G06F 17/30091; G06F 17/30097; G06F 17/30067  
USPC .......................................... 707/740, 828–831  
See application file for complete search history.

(56) References Cited

U.S. PATENT DOCUMENTS

| | | | |
|---|---|---|---|
| 5,819,275 A * | 10/1998 | Badger et al. | 707/758 |
| 6,353,837 B1 | 3/2002 | Blumenau | |
| 7,228,299 B1 | 6/2007 | Harmer et al. | |
| 7,383,274 B2 | 6/2008 | Pearce et al. | |
| 7,739,318 B2 | 6/2010 | Zayas et al. | |
| 7,752,226 B1 | 7/2010 | Harmer et al. | |
| 7,822,927 B1 | 10/2010 | Scheer | |
| 8,301,597 B1 * | 10/2012 | Zhou et al. | 707/626 |
| 2003/0009484 A1 * | 1/2003 | Hamanaka et al. | 707/200 |
| 2003/0220985 A1 | 11/2003 | Kawamoto et al. | |
| 2004/0252902 A1 | 12/2004 | Vienneau | |
| 2008/0046445 A1 | 2/2008 | Passey et al. | |
| 2008/0235300 A1 * | 9/2008 | Nemoto et al. | 707/204 |
| 2008/0301589 A1 * | 12/2008 | Carlson et al. | 715/847 |
| 2008/0320062 A1 * | 12/2008 | Miyamae et al. | 707/205 |
| 2011/0246491 A1 * | 10/2011 | Clash et al. | 707/755 |

OTHER PUBLICATIONS

Vahalia, Uresh, Unix Internals: The New Frontiers, 1996, p. 187-290, 338-371, Prentice-Hall, Inc., Upper Saddle River, New Jersey.  
C/C++: How to obtain the full path of current directory?, stackoverflow.com, Jan. 31, 2012, 5 pages, Stack Exchange Inc., New York, NY.  
Gite, Vivek, How to: Create Hard Links in Linux/UNIX, cybercity.biz, Oct. 9, 2007, 4 pages, nixCraft, Pune, India.

(Continued)

*Primary Examiner* — Brittany N Allen  
(74) *Attorney, Agent, or Firm* — Deepika Bhayana; Jason A. Reyes; Krishnendu Gupta

(57) ABSTRACT

For enabling a fast reverse lookup of parent directories storing records of hard links to a specified regular file, a file system manager maintains a hard link database (HLDB) storing information for addressing hard links to the regular files having multiple hard links. The HLDB contains a corresponding HLDB file for each regular file having multiple hard links. In a preferred implementation, the inode of each regular file stores the addressing information for one hard link to the regular file, a corresponding HLDB file stores the addressing information for other hard links to the regular file, each HLDB file is a directory accessed by invoking file system manager directory access routines, and the HLDB has a directory tree providing a multi-level hash index for searching the HLDB given the inode number of a regular file.

20 Claims, 21 Drawing Sheets

(56) References Cited

OTHER PUBLICATIONS

Gite, Vivek, UNIX Find a File Command, cybercity.biz, May 14, 2008, 5 pages, nicCraft, Pune, India.

Linux / Unix Command: Is, linux.about.com, Feb. 7, 2012, 4 pages, The New York Times Company, New York, NY.

In Unix, what is a hard link?, kb.iu.edu, May 13, 2009, one page, The Trustees of Indiana University, Bloomington, IN.

* cited by examiner

INODE TO PATHNAME SUPPORT WITH A HARD LINK DATABASE

FIELD OF THE INVENTION

The present invention relates generally to a file server that stores files in a file system that organizes the files in a directory tree permitting multiple hard links to a file. The present invention specifically relates to a hard link database storing information for addressing hard links to regular files having multiple hard links for a reverse lookup of pathnames of a regular file having multiple hard links.

BACKGROUND OF THE INVENTION

For convenient reference to stored computer data, the computer data is typically contained in one or more files. Each file has a logical address space for addressing the computer data in the file. In a typical general purpose digital computer or in a file server, an operating system program called a file system manager assigns each file a unique numeric identifier called a "file handle," and also maps the logical address space of the file to a storage address space of at least one data storage device such as a disk drive.

Typically a human user or an application program accesses the computer data in a file by requesting the file system manager to locate the file. After the file system manager returns an acknowledgement that the file has been located, the user or application program sends requests to the file system manager for reading data from or writing data to specified logical addresses of the file.

Typically the user or application program specifies an alphanumeric name for the file to be accessed. The file system manager searches one or more directories for the specified name of the file. A directory is a special kind of file. The directory includes an alphanumeric name and an associated file handle for each file in the directory. Once the file system manager finds the specified name in the directory, it may use the file handle associated with the specified name for reading or writing data to the file.

For referencing a large number of files, the files typically are grouped together in a file system including a hierarchy of directories. Each file is specified by an alphanumeric pathname through the hierarchy. The pathname includes the name of each directory along a path from the top of the hierarchy down to the directory that includes the file. To locate the file, the user or application program specifies the pathname for the file, and the file system manager searches down through the directory hierarchy until finding the file handle. The file system manager may return the file handle to the user or application program with an acknowledgement that the file has been located. The user or application program includes the file handle in subsequent requests to read or write data to the file.

For exception reporting and error recovery, a reverse lookup may be performed through the directory hierarchy. For example, as described in Scheer U.S. Pat. No. 7,822,927, when responding to a read or write request specifying a file handle, the file system manager may find that the file is inaccessible in disk storage, so that an automatic recovery application may need the pathname of the file in order to recover from the error by accessing a backup copy of the file in backup storage. The pathname of the file is obtained by a reverse lookup of the parent directory that contains an entry specifying the file handle. To obtain the full pathname of the file, the reverse lookup process is repeated until reaching the root directory of the file system.

In the usual case, the conventional file system directory structure is not organized for an efficient reverse lookup, so there have been a number of proposals for modifying or augmenting the conventional directory structure to accelerate a reverse lookup. For example, Scheer U.S. Pat. No. 7,822,927 provides a directory name lookup cache (DNLC) with child hash lists and a mechanism for searching for a parent handle and a child name associated with a specified child handle by searching a child hash list indexed by a hashing of the specified child handle. This method has the advantage of working without modification of the conventional directory structure, but this method is limited to finding pathnames that are in the DNLC cache.

Proposals for modifying the conventional directory structure to accelerate a reverse lookup are described in Harmer et al. U.S. Pat. No. 7,228,299 and Passey et al. U.S. Pat. App. Pub. 2008/0046445. Harmer et al. recognizes that in UNIX systems, a directory file includes a second entry, '..' or "dot-dot", that identifies the inode for the parent directory of that directory (except for the root directory), so that a reverse lookup from any directory up to the root directory may be performed to recover the pathname for any given directory. For a reverse lookup from a non-directory file, the inodes of non-directory files may include parent directory information (68 in FIG. 2 of Harmer et al.). To support multiple links, a file's inode may include multiple parent directory inode identifiers in the parent information. An inode's parent information may also indicate the current number of links to the associated file if it is desired to be able to return all pathnames to the file.

Passey et al. U.S. 2008/0046445 proposes to include, in the inode of a file (in FIG. 6A of Passey et al.), a list of parent identifiers and a link count for each parent of the inode. Passey et al. also shows the inode as including a reverse lookup hint, which is a hash value of a name for the file. The reverse lookup hint is used as a search key for searching a parent directory for the file.

The proposals for modifying the conventional directory structure to accelerate a reverse lookup indicate that there is a difficulty associated with finding all of the pathnames for a file when the file system supports multiple hard links. In general, a directory entry for a file is called a hard link to that file. When the file system supports multiple hard links, any file may have one or more hard links to it, either in the same or in different directories. Thus a file is not bound to a single directory and does not have a unique name. In other words, the file name is not an attribute of the file. Instead, in a UNIX-based file system, a file is uniquely specified by its inode number and its device ID, which are attributes of the file. To support multiple hard links, the file has an attribute called a link count, specifying the number of hard links to the file. The file continues to exist as long as its link count is greater than zero. The hard links to the file are equal in all ways and are simply different names for the same file. The file may be accessed through any of its hard links, and there is no way to tell which is the original hard link. See Uresh Vahalia, *UNIX® Internals The New Frontiers*, 1996, pp. 220-225, Prentice-Hall, Inc., Upper Saddle River, N.J.

SUMMARY OF THE INVENTION

In accordance with one aspect, the invention provides a method of operating a file server. The file server has data storage storing a file system, a data processor coupled to the data storage for access to files in the file system, and non-transitory computer readable storage medium coupled to the data processor and storing computer instructions. The file system includes a hierarchy of directories and regular files that are not directories. The directories contain records of hard links to the regular files. There are multiple hard links to each of some of the regular files, so that each of some of the regular files has multiple hard links. Each of the hard links includes a respective file name. The data storage stores a hard link database. The hard link database includes hard link database files. There is a one-to-one correspondence between each of the regular files having multiple hard links and each of the hard link database files. Each of the hard link database files stores one or more records of addressing information for addressing one or more of the hard links to the corresponding one of the regular files having multiple hard links. The computer instructions, when executed by the data processor, perform the steps of: (a) maintaining the one-to-one correspondence between said each of the regular files having multiple hard links and said each of the hard link database files by adding and deleting corresponding hard link database files in the hard link database and adding and deleting records in the corresponding hard link database files in response to adding and removing multiple hard links to regular files in the file system, and (b) performing a reverse lookup of parent directories storing records of hard links to a specified regular file having multiple hard links by accessing the corresponding one of the hard link database files to read addressing information from records in the corresponding one of the hard link directory files, and using the addressing information read from the records in the corresponding one of the hard link directory files to address the records of hard links to the specified regular file having multiple hard links.

In accordance with another aspect, the invention provides a file server. The file server includes data storage containing a file system, a data processor coupled to the data storage for access to files in the file system, and non-transitory computer readable storage medium coupled to the data processor and storing computer instructions. The file system includes a hierarchy of directories and regular files that are not directories. The directories contain records of hard links to the regular files. There are multiple hard links to each of some of the regular files, so that each of some of the regular files has multiple hard links. Each of the hard links includes a respective file name. The data storage contains a hard link database. The hard link database includes hard link database files. There is a one-to-one correspondence between each of the regular files having multiple hard links and each of the hard link database files. Each of the hard link database files contains one or more records of addressing information for addressing one or more of the hard links to the corresponding one of the regular files having multiple hard links. The computer instructions, when executed by the data processor, perform the steps of: (a) maintaining the one-to-one correspondence between said each of the regular files having multiple hard links and said each of the hard link database files by adding and deleting corresponding hard link database files in the hard link database and adding and deleting records in the corresponding hard link database files in response to adding and removing multiple hard links to regular files in the file system; and (b) performing a reverse lookup of parent directories storing records of hard links to a specified regular file having multiple hard links by accessing the corresponding one of the hard link database files to read addressing information from records in the corresponding one of the hard link directory files, and using the addressing information read from the records in the corresponding one of the hard link directory files to address the records of hard links to the specified regular file having multiple hard links.

In accordance with another aspect, the invention provides a file server. The file server comprises data storage containing a file system, a data processor coupled to the data storage for access to files in the file system, and non-transitory computer readable storage medium coupled to the data processor and storing computer instructions. The file system includes a hierarchy of directories and regular files that are not directories. The directories contain records of hard links to the regular files. There are multiple hard links to each of some of the regular files, so that each of some of the regular files has multiple hard links. Each of the hard links includes a respective file name. The data storage contains a hard link database. The hard link database includes hard link database files. There is a one-to-one correspondence between each of the regular files having multiple hard links and each of the hard link database files. Each of the hard link database files contains one or more records of addressing information for addressing one or more of the hard links to the corresponding one of the regular files having multiple hard links. Each regular file in the file system contains an attribute providing addressing information for addressing the record of one hard link to each regular file in the file system. Each hard link database file contains records for hard links other than the one hard link to the corresponding regular file addressed by the addressing information provided by the attribute contained in the corresponding regular file. The addressing information in each record of each hard link database file includes an inode number and a directory cookie, and the inode number and the directory cookie are encoded in a character string in each record of each hard link database file. The hard link database files are directories. The computer instructions, when executed by the data processor, perform the steps of: (a) maintaining the one-to-one correspondence between said each of the regular files having multiple hard links and said each of the hard link database files by adding and deleting corresponding hard link database files in the hard link database and invoking file system manager directory access routines for adding and deleting records in the corresponding hard link database files in response to adding and removing multiple hard links to regular files in the file system, and (b) performing a reverse lookup of parent directories storing records of hard links to a specified regular file having multiple hard links by invoking file system manager directory access routines to access the corresponding one of the hard link database files to read addressing information from records in the corresponding one of the hard link directory files, and to use the addressing information read from the records in the corresponding one of the hard link directory files to address the records of hard links to the specified regular file having multiple hard links.

BRIEF DESCRIPTION OF THE DRAWINGS

Additional features and advantages of the invention will be described below with reference to the drawings, in which.

Figure 1:
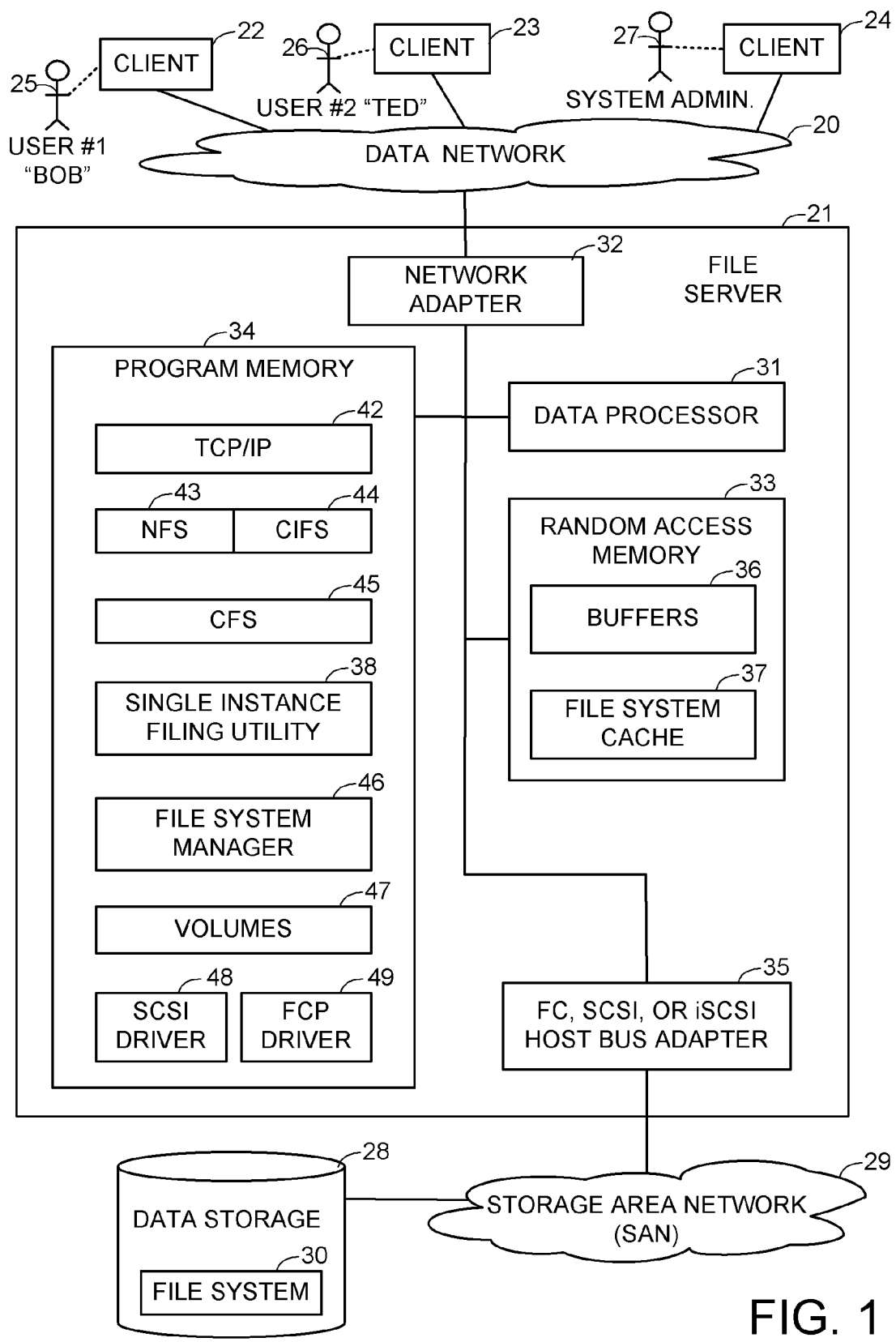
FIG. 1 is a block diagram of a data network including a file server incorporating the present invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a data network 20 including a file server 21 for servicing file access requests from network clients 22, 23, 24. The network clients 22, 23, 24, for example, are workstations operated by respective human users 25, 26, 27. The file server permits the clients 22, 23, 24 to access files in a file system 30 stored in data storage 28 linked to the file server 21 via a storage area network (SAN) 29. The data storage 28, for example, is an array of disk drives.

The file server 21 includes a data processor 31, a network adapter 32 linking the data processor to the data network 20, random access memory 33, program memory 34, and a Fibre-Channel (FC), Small Computer Systems Interface (SCSI), or Internet Protocol SCSI (iSCSI) host bus adapter 35 linking the data processor to the storage area network (SAN) 29. The data processor 31 is a general purpose digital computer data processor including one or more core central processing units (CPUs) for executing computer program instructions stored in the program memory 34. The program memory 34 is a non-transitory computer readable storage medium, such as electrically erasable and programmable read-only memory (EEPROM). The random access memory 33 includes buffers 36 and a file system cache 37.

The program memory 34 includes a program layer 42 for network communication using the Transmission Control Protocol (TCP) and the Internet Protocol (IP). The program memory also includes a Network File System (NFS) module 43 for supporting file access requests using the NFS file access protocol, and a Common Internet File System (CIFS) module 44 for supporting file access requests using the CIFS file access protocol.

The NFS module 43 and the CIFS module 44 are layered over a Common File System (CFS) module 45. The CFS module 45 is layered over a file system manager module 46. The file system manager module 46 supports a UNIX-based file system, and the CFS module 45 provides higher-level functions common to NFS and CIFS. For example, the file system manager module 46 maintains the file system 30 in the data storage 28, and maintains the file system cache 37 in the random access memory 33. The conventional organization and management of a UNIX-based file system is described in Uresh Vahalia, Unix Internals—The New Frontiers, Chapter 9, File System Implementations, pp. 261-290, Prentice-Hall, Inc., Upper Saddle River, N.J. (1996).

The program memory 34 further includes a logical volumes layer 47 providing a logical volume upon which the file system 30 is built. The logical volume is configured from the data storage 28. For example, the logical volume is configured from one or more logical unit numbers (LUNs) of the data storage 28. The logical volumes layer 47 is layered over a SCSI driver 48 and a Fibre-Channel protocol (FCP) driver 49 in order to access the logical unit numbers (LUNs) in the storage area network (SAN) 29. The data processor 31 sends storage access requests through the host bus adapter 35 using the SCSI protocol, the iSCSI protocol, or the Fibre-Channel protocol, depending on the particular protocol used by the storage area network (SAN) 29.

The present invention concerns a way of providing the file system manager 46 with a reverse lookup capability for regular files that have multiple hard links. The reverse lookup capability provides a way of finding all of the hard links to a regular file having a specified inode number. Thus, the reverse lookup capability provides inode to pathname support for applications that use regular files having multiple hard links. For example, the program memory 34 includes a single instance filing (SIF) utility 38 that uses regular files having multiple hard links.

Figure 2:
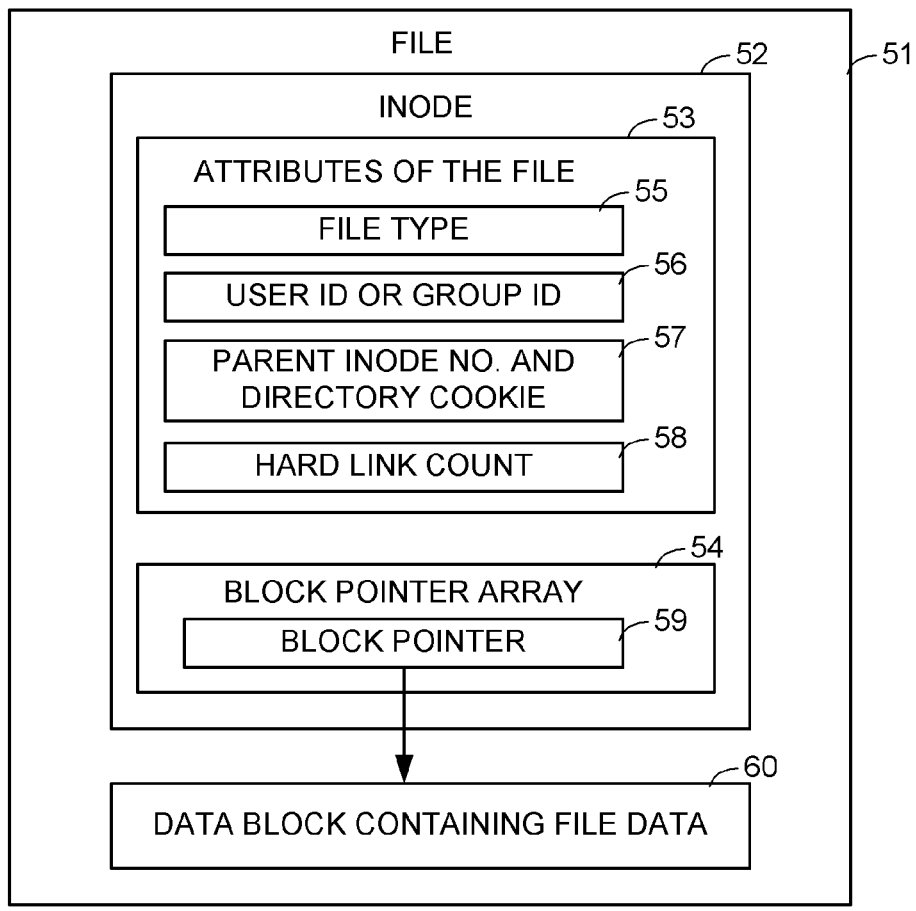
FIG. 2 is a block diagram of a file in the file system introduced in FIG. 1.

FIG. 2 shows a file 51. The file 51 includes an inode 52, which contains file attributes 53 and a block pointer array 54. The file attributes 53 include a file type 55, and a user ID or group ID 56, an attribute 57 providing addressing information for addressing the record of one hard link to the regular file, and a hard link count 58. The block pointer array 54 includes a block pointer 59 pointing to a data block 60 containing file data.

The preferred form of the hard link addressing information 57 is the parent inode number of a parent directory that stores one hard link to the file 51, and a directory cookie identifying the entry in this parent directory corresponding to this one hard link. This hard link address information 57 provides a way of finding one hard link to the file 51 without a full search of the file system to find a parent directory followed by a full search of the parent directory to find the entry of this hard link. Instead, one name for the file 51 is found in the parent directory having the parent inode number, and this one name for the file 51 is found in a directory entry identified by the directory cookie.

Figure 3:
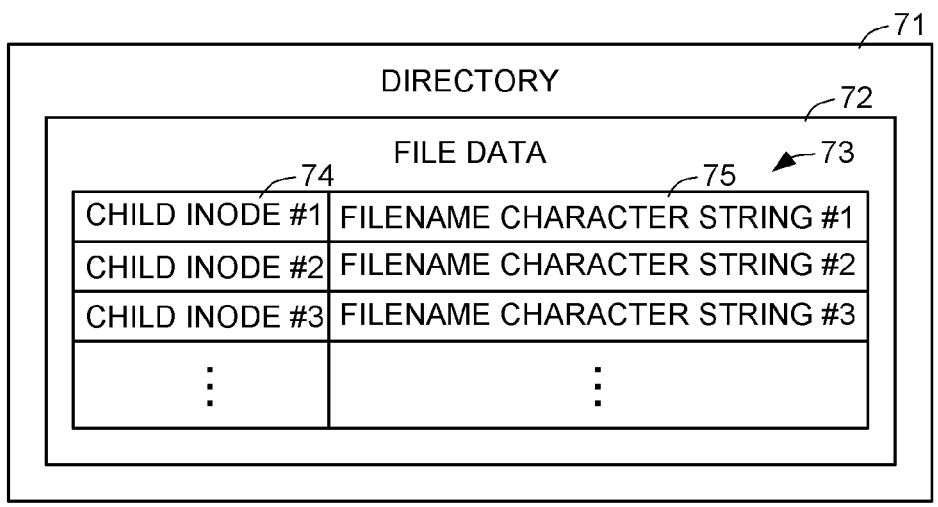
FIG. 3 is a block diagram of a directory in the file system introduced in FIG. 1.

FIG. 3 shows a directory 71. The directory 71 is a special type of file maintained by the file system manager (46 in FIG. 1). The directory 71 includes file data 72 in the form of a list of records 73. Each of the records 73 includes a child inode number 74 and a filename character string 75. The filename character string 75 contains the file name of a hard link from the directory 71 to a file specified by the child inode number.

Figure 4:
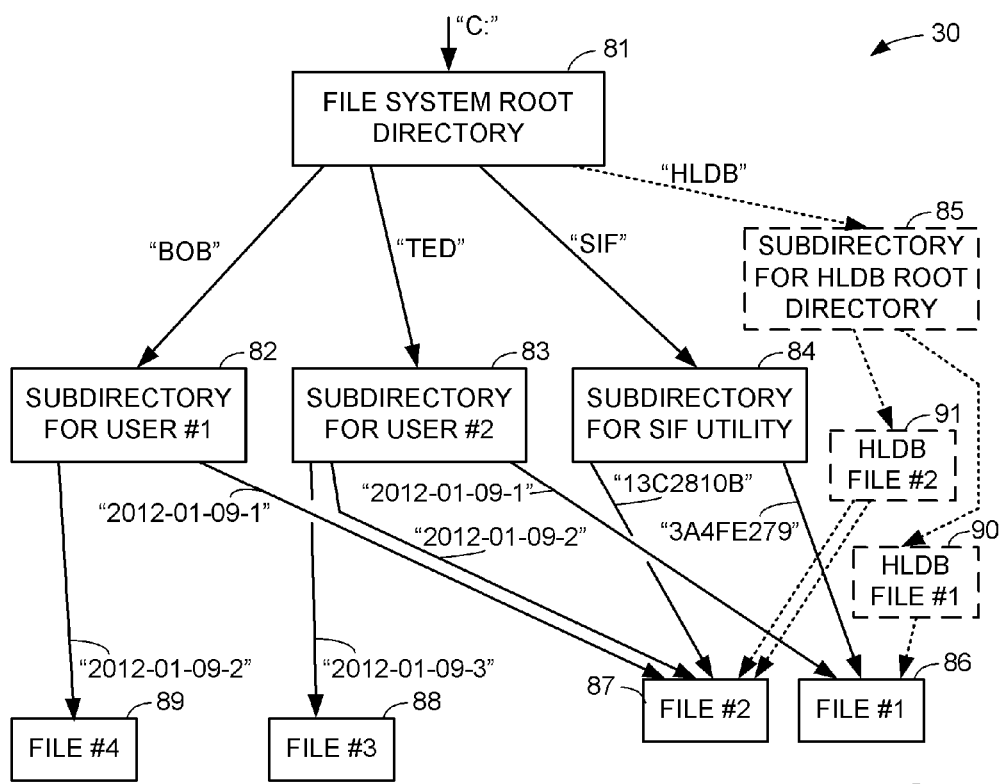
FIG. 4 is a block diagram of the hierarchical structure of the file system introduced in FIG. 1.

FIG. 4 shows the hierarchical structure of the file system 30. The file system 30 includes a file system root directory 81, multiple subdirectories 82, 83, 84, 85, and multiple regular files 86, 87, 88, 89. The regular files are "leaf nodes" at the bottom of the file system hierarchy. Each subdirectory 82, 83, 84, 85 has one hard link to it from a parent directory, and each regular file has one or more hard links to it from one or more parent directories. Each hard link has a file name. Because a regular file may have more than one hard link to it, the file name of a hard link to the regular file is not an attribute of the regular file. The file name and a child inode number of the regular file are stored in a corresponding entry of the parent directory.

For example, the file system 30 has a file system root directory 81 identified by a drive designation "C:". The file system root directory 81 has an entry for a hard link named "BOB" to a subdirectory 81 for the first user (25 in FIG. 1), an entry for a hard link named "TED" to a subdirectory 83 for a second user (26 in FIG. 1), an entry named "SIF" to a subdirectory 84 for the single instance filing utility (38 in FIG. 1), and an entry named "HLDB" to a subdirectory 85, which is the root directory for a hard link data base (HLDB). In this fashion, the file name of each link provides a way of associating each subdirectory 82, 83, 84, 85 with the name of a particular user or application or function in the data network of FIG. 1.

The multiple hard links to each regular file provide a way for different users to share each regular file. Although different users may share a single regular file, each user may access the regular file though a different hard link having a different file name. In this way, each regular file accessed by each user may have a particular name that is unique to the regular files of each user yet different for different users. Thus, each user may access a shared file with a different file name that has particular significance to each user. For example, in the file system 30 of FIG. 4, each file name of each hard link in the subdirectory 82 for the first user "BOB" is automatically assigned a unique value by concatenating a date stamp and a sequence number when the hard link is created. For example, the subdirectory 82 is BOB's E-mail in-box, and BOB's E-mail application automatically assigns the date stamp and sequence number to an E-mail file or attachment when the E-mail file or attachment is received.

On the other hand, the single-instance filing utility 38 automatically assigns a file name to each hard link in the subdirectory 84 based on the data content of the regular file pointed to by the hard link. For example, the file name is a hash value of the data content, concatenated with a version number when it is found that different regular files having the same hash value have different data. In this way, the file name provides a way of identifying regular files that may contain duplicate data. Thus, the subdirectory 84 for the single-instance filing utility contains hard links to a set of regular files that do not contain any files having the same file data.

For example, as shown in FIG. 4, the subdirectory 83 for the second user "TED" has a first hard link named "2012-01-09-1" to a first regular file 86, and the subdirectory 84 for the SIF utility has a first hard link named "3A4FE279" to the first regular file 86, so that the first regular file 86 is shared between the second user "TED" and the SIF utility. The subdirectory 82 for the first user "BOB" contains a first hard link named "2012-01-09-01" to a second regular file 87, the subdirectory 83 for the second user "TED" contains a second hard link named "2012-01-09-2" to the second regular file 87, and the subdirectory 83 for the SIF utility contains a second hard link named "13C2810B" to the second regular file 87, so that the second regular file 87 is shared among the first user "BOB" and the second user "TED" and the SIF utility. The subdirectory 83 for the second user "TED" contains a third hard link named "2012-01-09-3" to a third regular file 88. The subdirectory 82 for the first user "BOB contains a second hard link named "2012-01-09-2" to the fourth regular file 89.

Figure 5:
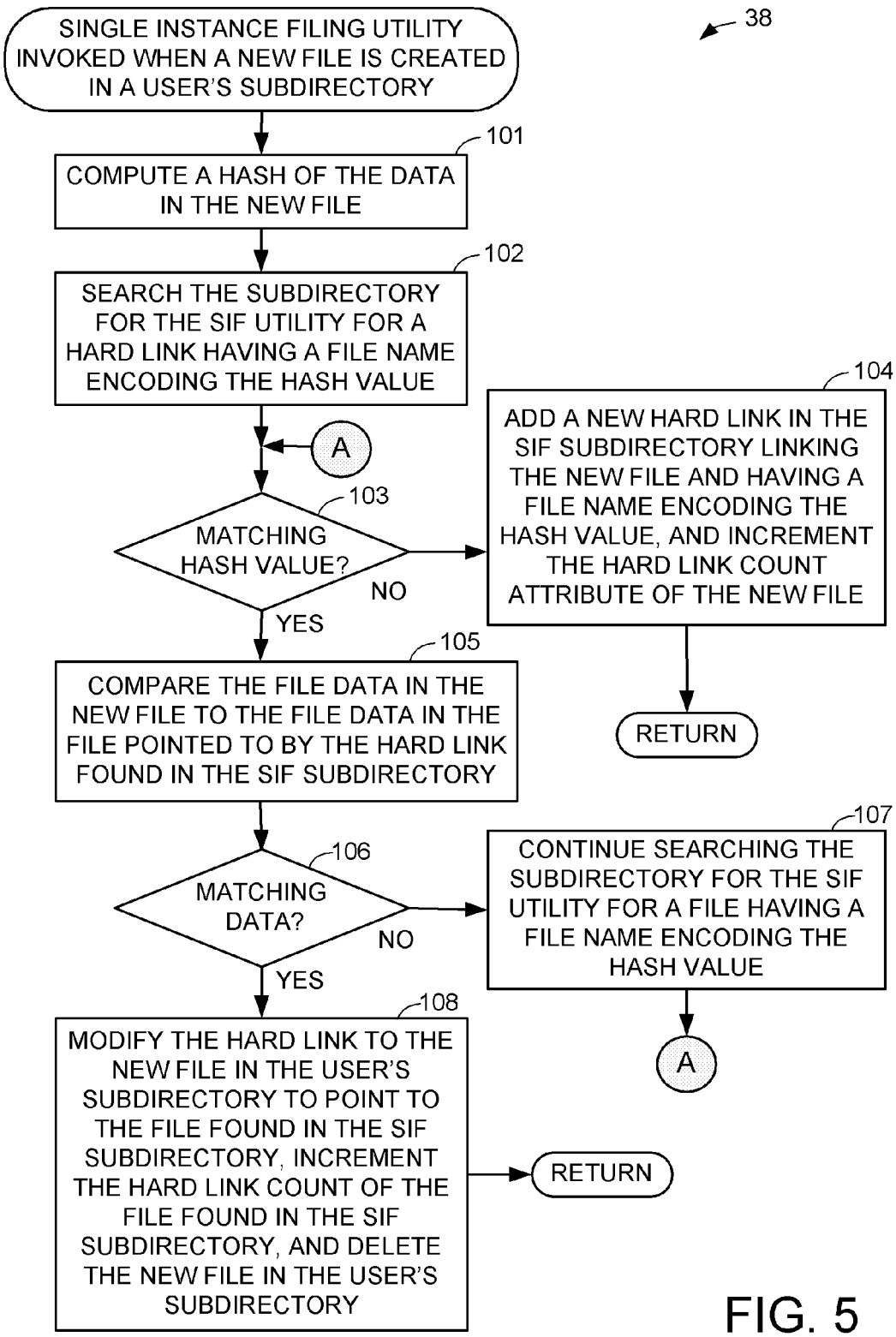
FIG. 5 is a flowchart of a single instance filing utility of the file server in FIG. 1.

FIG. 5 shows the operation of the single instance filing utility (38 in FIG. 1) when a new file is created in the user's subdirectory. For example, the routine of FIG. 5 is invoked when the third regular file 88 in FIG. 4 has been created and there is a single hard link to the third regular file 88 from the subdirectory 83. In a first step 101 of FIG. 5, the SIF utility computes a hash of the data in the new file. Then, in step 102, the SIF utility searches the subdirectory for the SIF utility for a hard link having a file name encoding the hash value. In step 103, if a hard link is not found having a file name encoding the hash value, then execution branches to step 104. In step 104, the SIF utility adds a new hard link to the SIF subdirectory linking the new file and having a file name encoding the hash value, and the hard link count attribute of the new file is incremented by one, and execution returns.

In step 103, if a hard link is found having a file name encoding the hash value, then execution continues to step 105. In step 105, the SIF utility compares the file data in the new file to the file data in the file pointed to by the hard link found in the SIF subdirectory. In step 106, if the file data in the new file does not match the file data in the file pointed to by the hard link found in the SIF subdirectory, then execution branches to step 107. In step 107, the SIF utility continues searching the SIF subdirectory for a hard link having a file name encoding the hash value, and execution loops back to step 103. In step 106, if the file data in the new file matches the file data in the file pointed to by the hard link found in the SIF subdirectory, then execution continues to step 108. In step 108, the SIF utility modifies the hard link to the new file in the user's subdirectory to point to the file found in the SIF subdirectory, the hard link count of the file found in the SIF subdirectory is incremented, and the SIF utility deletes the new file in the user's subdirectory, and execution returns. In particular, the SIF utility modifies the hard link to the new file in the user's subdirectory to point to the file found in the SIF subdirectory by replacing the inode number of the duplicate file found in the user subdirectory with the inode number of the file having the matching file data found in the SIF subdirectory. In this fashion, duplicate files in the file system are deleted as hard links are added to files in the file system.

Over time, the use of hard links for sharing regular files among users and applications tends to result in two distinct classes of the regular files. The first class includes those regular files that have a single hard link to them. The second class includes those regular files that have multiple hard links to them. This causes a problem of an efficient and reliable reverse lookup to find all the hard links to a regular file having a specified inode number when an exception occurs when accessing the regular file.

Figure 6:
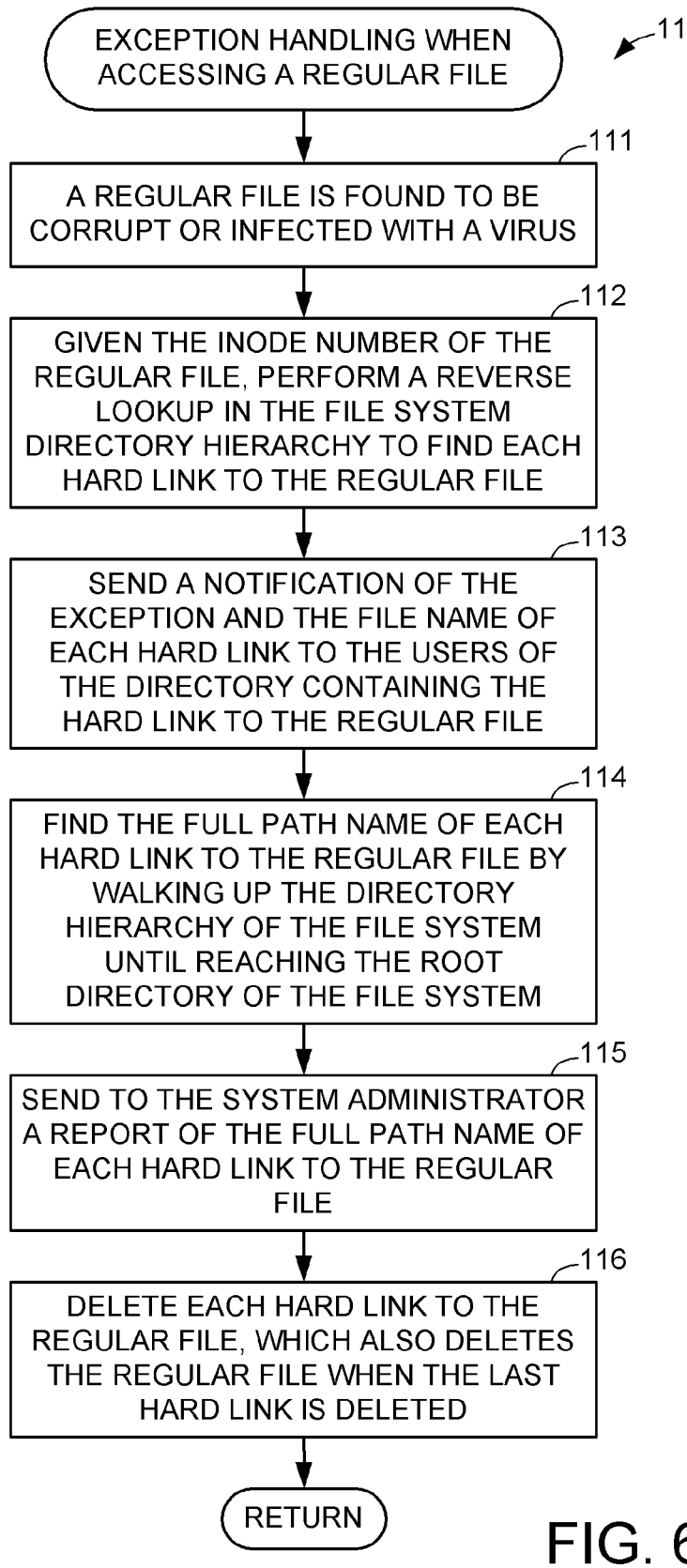
FIG. 6 is a flowchart of an exception handling routine invoked when an exception occurs when accessing a regular file in the file system of FIG. 4.

FIG. 6 shows such an exception handling routine. In a first step 111, a regular file is found to be corrupt or infected with a virus. In step 112, given the inode number of the regular file, a reverse lookup is performed in the file system directory hierarchy to find each hard link to the regular file. In step 113, a notification of the exception and the file name of each hard link are sent to the users of the directory containing the hard link to the regular file. In step 114, the full path name of each hard link is found by walking up the directory hierarchy of the file system until reaching the root directory of the file system. In step 115, the exception handling routine sends to the system administrator a report of the full path name of each hard link to the regular file. In step 116, the exception handling routine deletes each hard link to the regular file, which also deletes the regular file when the last hard link is deleted. In particular, when each hard link is deleted, the "hard link count" file attribute of the regular file is decremented by one, and once the hard link count is decremented to zero, the regular file is deleted. Then the exception handling routine is finished.

For example, suppose that the regular file 86 in FIG. 4 is found to be corrupt when the file is accessed. Then the reverse lookup finds the hard link named "2012-01-09-1" in the subdirectory 83, and the exception handling routine finds a user ID for the user "TED" in the "user ID" attribute of the subdirectory 83, and therefore the exception handling routine sends a notification message that the file "2012-01-09-1" has been deleted to the user "TED" using a notification method that "TED" has previously registered with the operating system. The reverse lookup also finds the hard link named "3A4FE279" in the subdirectory 84, and the exception handling routine finds a user ID for the application "SIF" in the "user ID" attribute of the subdirectory 84, and therefore the exception handling routine sends a notification message that the file "3A4FE279" has been deleted to the user "SIF" using a notification method that "SIF" has previously registered with the operating system. The exception handling routine also reports the full path names "C:\TED\2012-01-09-1" and "CASIF\3A4FE279" to the system administrator. The notified users or the system administrator may then use these notifications to recover from the exception, for example, by locating a backup copy of the file, and restoring the deleted file with the backup copy.

For a large file system in which there are many regular files having multiple hard links, a hard link database is provided in order to give users and applications real-time notifications of exceptions. Such a hard link database is built on the existing file system management infrastructure so as to exploit the conventional file system recovery capabilities (such as the UNIX "fsck" utility) in case of a system crash, and the hard link database maintenance and search routines are designed with little modification to the conventional file system manager routines so that the hard link database is portable with the file system during replication or migration or upgrade to future file system versions. These objectives are met by providing each regular file having multiple hard links with a corresponding hard link database file containing records addressing hard links to the regular file, so that there is a one-to-one correspondence between each regular file having multiple hard links and a corresponding one of the hard link data base files. Therefore there are as many corresponding hard link data base files as there are regular files having multiple links. The corresponding hard link database files will be referred to as "HLDB" files.

In a preferred implementation of the hard link database, each HLDB file contains one or more records for all of the hard links to the corresponding regular file other than one hard link addressed by the addressing information in the attribute (57 in FIG. 2) contained in the inode of the corresponding regular file. Each HLDB file contains one or more records only for hard links to the corresponding file. Thus, in the preferred implementation, the number of records in each HLDB file is one less than the number of hard links to the corresponding regular file, and the number of HLDB files in the hard link database for the file system is equal to the number of regular files having more than one hard link in the file system.

The preferred format for a HLDB file is the format of a directory, so that the HLDB files have a "file type" of directory, and the HLDB files are accessed using the conventional file system manager directory access routines. For example, adding, removing, changing, locating, and enumerating entries in a HLDB file are the normal directory create, remove, rename, lookup, and readdir operations.

In a preferred format, a record in a HLDB file includes the inode number of the corresponding regular file and an alphanumeric string. The alphanumeric string encodes the inode number of a parent inode and the directory cookie of a hard link in the directory of the parent inode, as will be further described below with reference to FIG. 14. The directory cookie permits the file name of the hard link to be retrieved from the directory of the parent inode without a full search of the directory of the parent inode. The inode number of the corresponding regular file in each entry of the HLDB file provides a hard link back to the regular file for recovery purposes, but this hard link back to the regular file is not counted in the "hard link count" attribute of the regular file or otherwise treated as a hard link so as to avoid infinite recursion in the hard link database. Thus, the hard link from the corresponding HLDB file back to the regular file is not reported to a user, application, or other client as a hard link of the original file.

In a preferred configuration, the HLDB subdirectories and the HLDB files are system files hidden from the users and applications that are not operating system applications. In FIG. 4, the HLDB subdirectory 85 and the HLDB files 90 and 91 are shown in dashed representation to indicate that they are hidden system files.

For example, as shown in FIG. 4, the regular file 86 having two visible hard links to it has a corresponding HLDB file 90, and the regular file 87 having three visible hard links to it has a corresponding HLDB file 91. For searching for the HLDB file corresponding to a given regular file, the subdirectory 85 has a hard link to the HLDB file 90 and a hard link to the HLDB file 91. In a more general case, the subdirectory 85 is a HLDB root directory of a directory tree including lower-level HLDB subdirectories, and the HLDB files are leaf nodes in this directory tree, as further described below with reference to FIG. 15.

Figure 7:
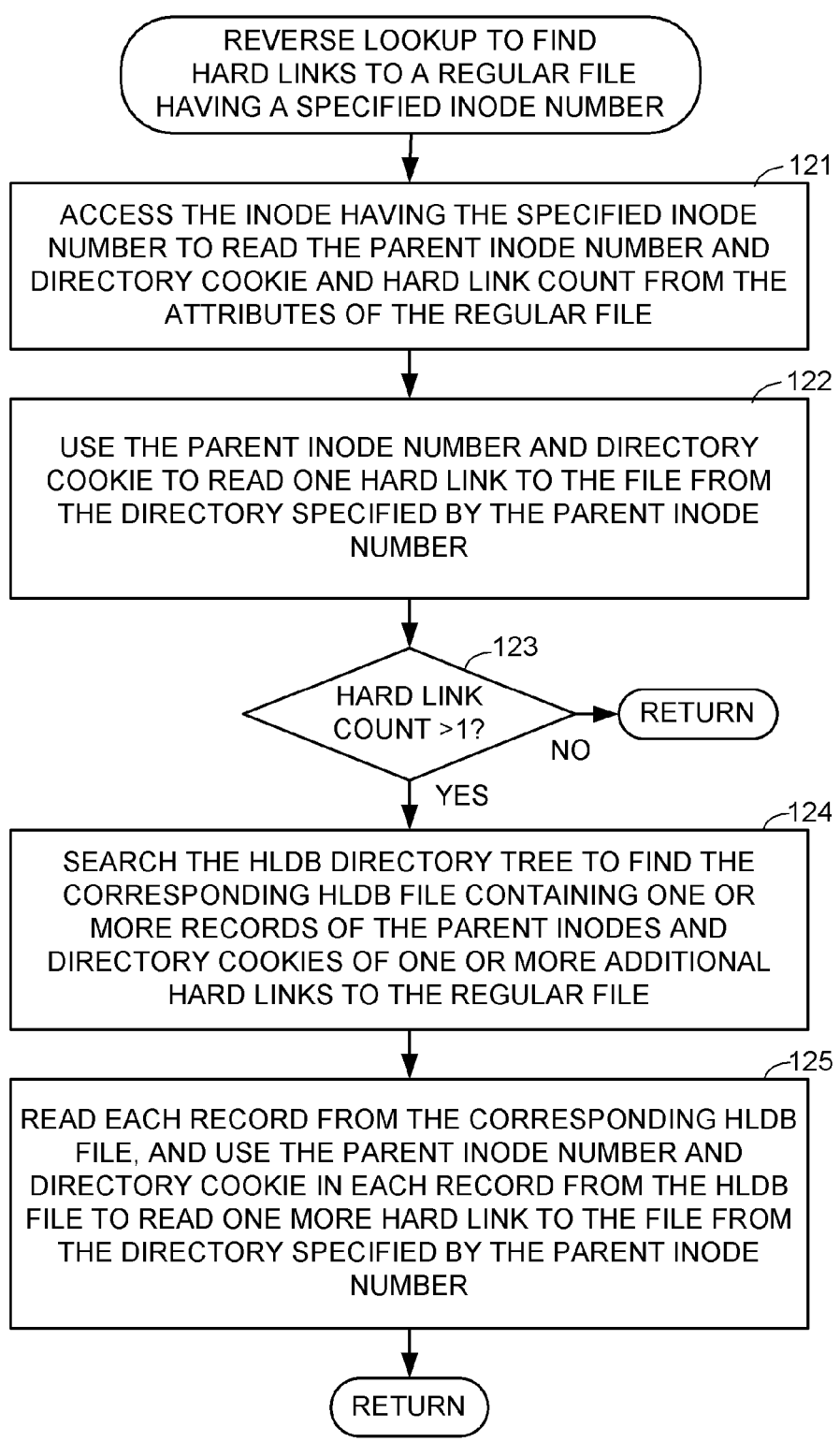
FIG. 7 is a flowchart of a reverse lookup routine invoked to find hard links to a regular file having a specified inode number.

FIG. 7 shows a reverse lookup routine invoked to find hard links to a regular file having a specified inode number. In a first step 121, the specified inode number is used to access the inode of the regular file to read the parent inode number and directory cookie and hard link count from the attributes of the regular file. Then in step 122, the parent inode number and the directory cookie are used to read one hard link to the file from the directory specified by the parent inode number. In step 123, if the hard link count is not greater than one, then execution returns. In this case, the regular file does not have a corresponding HLDB file.

In step 123, if the hard link count is greater than one, then execution continues from step 123 to step 124. In this case, the regular file should have a corresponding HLDB file including one or more records of one or more hard links in addition to the hard link found in step 122. In step 124, the HLDB directory tree is searched to find the HLDB file corresponding to the regular file having the specified inode number. Such a search is described further below with reference to FIGS. 17 and 18. In step 125, each record is read from the corresponding HLDB file, and the parent inode number and directory cookie in each record from the HLDB file are used to read a hard link to the regular file from the directory specified by the parent inode number. After step 125, the reverse lookup is finished.

Figure 8:
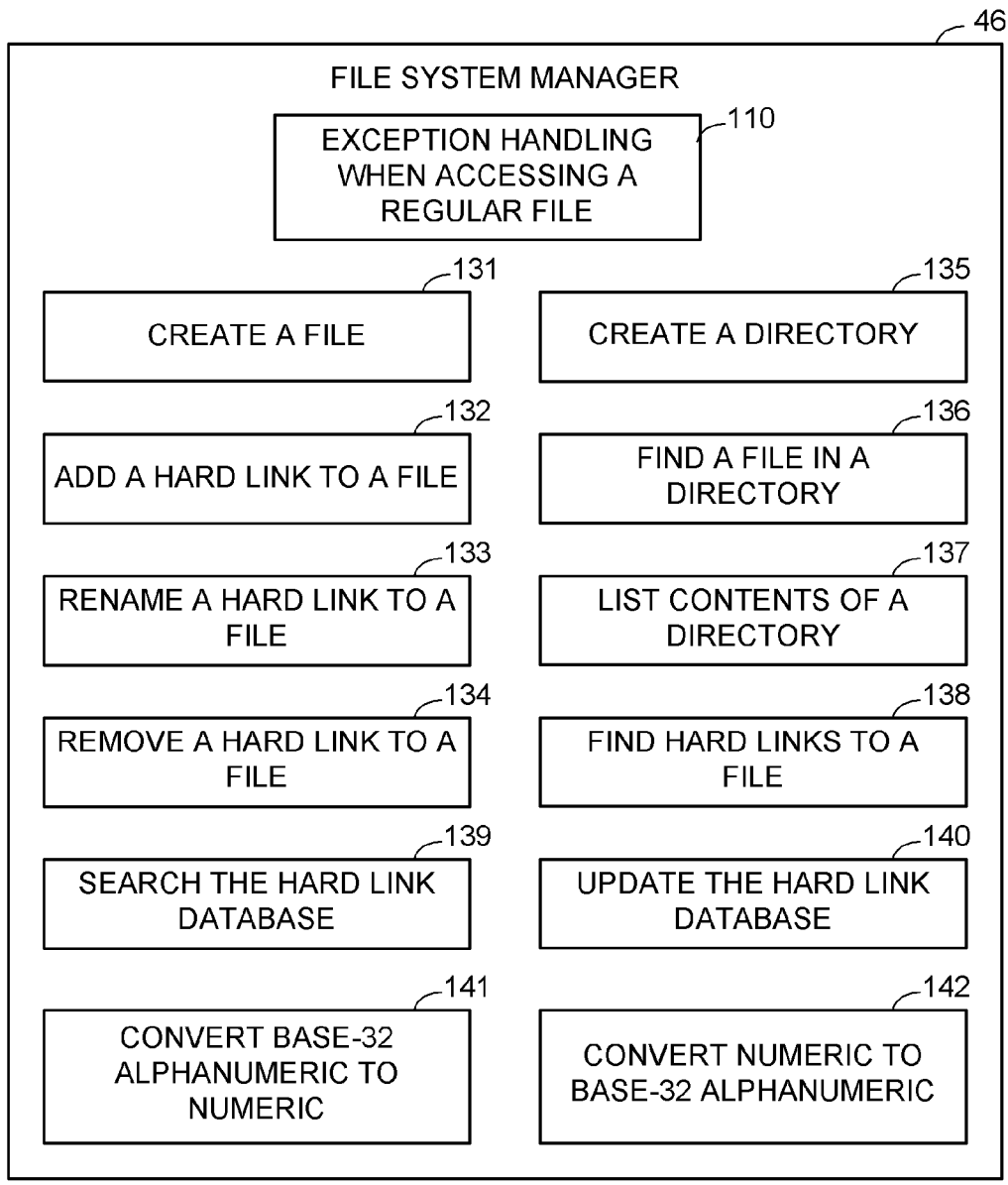
FIG. 8 is a block diagram of various program routines in the file system manager of the file server in FIG. 1.

FIG. 8 shows various program routines in the file system manager of the file server in FIG. 1. These program routines include a routine 110 to perform the exception handling when accessing a regular file, as described above with respect to FIG. 6. These program routines also include routines to perform the usual file system manager functions, such as create a file 131, add a hard link to a file 132, rename a hard link to a file 133, remove a hard link to a file 134, create a directory 135, find a file in a directory 136, and list contents of a directory. For the case of operations upon a regular file, the routines to create 131 a file, to add 132 a hard link to a file, to rename 133 a hard link to a file, and to remove 134 a hard link to a file, have some new added steps to update the parent inode number and directory cookie attributes (57 in FIG. 2) and to update the HLDB database, as further described below with reference to FIGS. 9, 10, 11, and 12. A new routine 138 is added to find hard links to a file, as described above with reference to FIG. 7. A new routine 139 is added to search the hard link database, as described below with reference to FIGS. 17 to 18. A new routine 140 is added to update the hard link database, as described below with reference to FIGS. 19 to 20. A new routine 141 is added to convert a base-32 alphanumeric string to a numeric value, as described below with reference to FIG. 21. A new routine 142 is added to convert a numeric value to a base-32 alphanumeric string, as described below with reference to FIG. 22.

A typical sequence of operations on a regular file with multiple links is as follows. When the regular file is created (131 in FIG. 8), its single parent directory inode number and the directory cookie to its file name is recorded in the hard link addressing information attribute (57 in FIG. 2) in the inode (52 in FIG. 2) of the regular file. When a second hard link to the regular file is added (132 in FIG. 8), a corresponding HLDB file is created and a record is added to the HLDB file, and when additional hard links to the regular file are added, additional records are added to this corresponding HLDB file. When any hard link is renamed (133 in FIG. 8) so that the hard link addressing information is changed, then that hard link addressing information is changed in the inode of the regular file or in the record in the corresponding HLDB file. In a similar fashion, if a migration of the file system were to change the directory structure so that the directory offsets would change (e.g., when changing locales so that the character set encoding of the file names and the directory record size would change), then the directory cookies are changed in a corresponding fashion in the hard link addressing information attributes of the child inodes and in the records in the HLDB files. When a hard link to the regular file is removed (134 in FIG. 8), the corresponding hard link addressing information is removed from the child inode of the regular file or from the corresponding HLDB file.

If the corresponding hard link addressing information is removed from the child inode of the regular file and there is at least one record of an additional hard link in the corresponding HLDB file, then a record is removed from the corresponding HLDB file and the hard link addressing information from this record is placed in the hard link addressing attribute in the child inode of the regular file. If there are multiple records in the corresponding HLDB file, it does not matter which record is removed from the corresponding HLDB file. For example, the record to remove is the first one found by a search of the HLDB file beginning at a random offset. If the HLDB file becomes empty due to the removal of the last record in the HLDB file, then the HLDB file is deleted. At all times a valid parent inode number is kept in the child inode of the regular file, and the parent inode number can be used to access the parent directory to find a file name of a hard link to the regular file.

Figure 9:
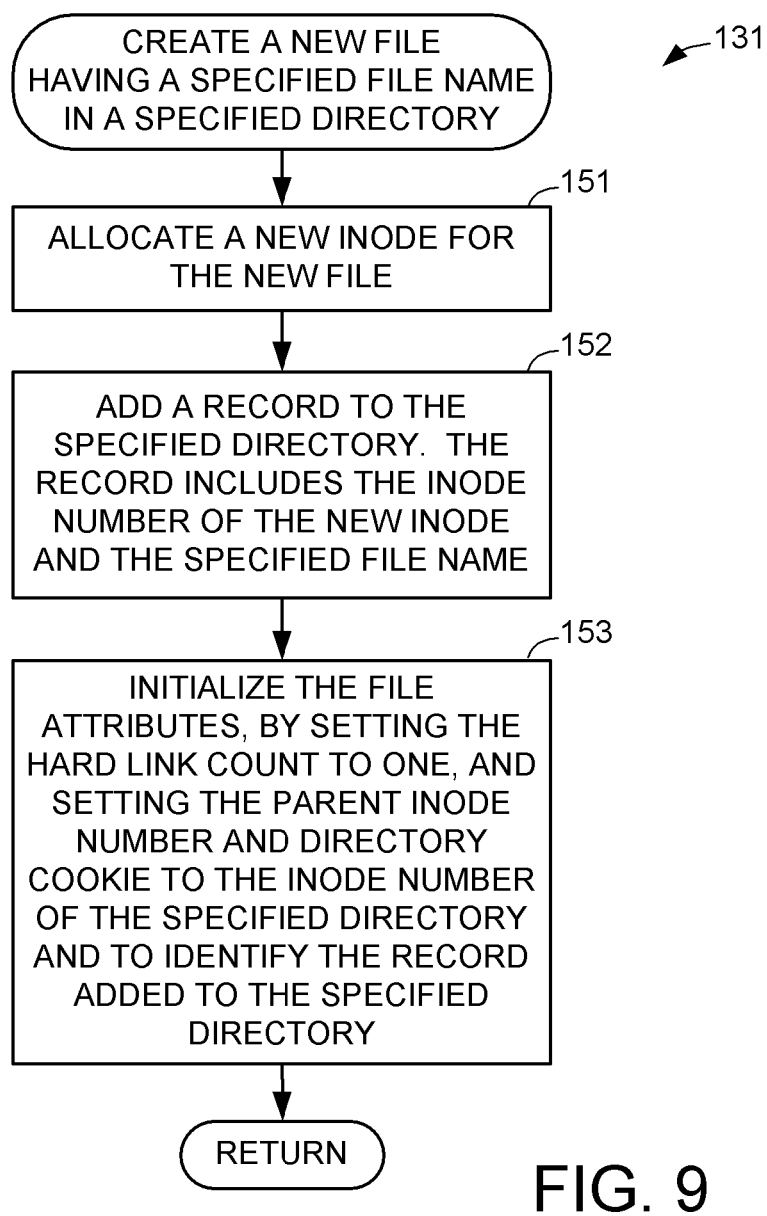
FIG. 9 is a flowchart of a file system manager routine for creating a new file having a specified file name in a specified directory.

FIG. 9 shows details of the file system manager routine 131 for creating a new file having a specified file name in a specified directory. In a first step 151 a new inode is allocated for the new file. Next, in step 152, a record is added to the specified directory. The record includes the inode number of the new inode and the specified file name. Then, in step 153, the file attributes are initialized by setting the hard link count to one, and setting the parent inode number and directory cookie to the inode number of the specified directory and the directory cookie of the record added to the specified directory. After step 153, execution returns.

Figure 10:
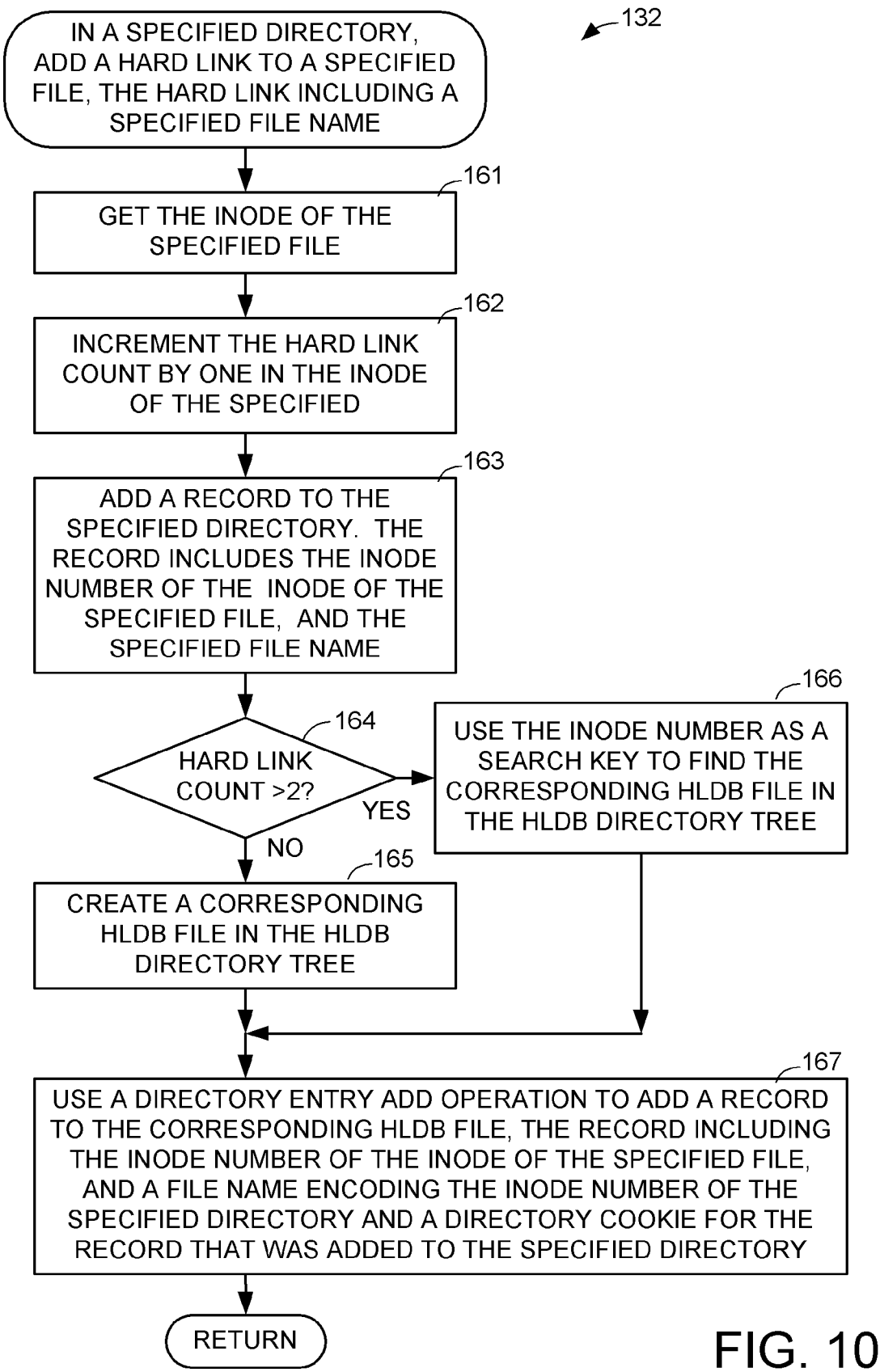
FIG. 10 is a flowchart of a file system manager routine for adding a hard link to a specified file.

FIG. 10 shows details of the file system manager routine 132 for adding a hard link to a specified file. In a first step 161, the inode of the specified file is fetched. For example, the file is specified by a file handle, and the inode number for the specified file is stripped from the file handle, and used to index the inode of the specified file. In step 162, the hard link count is incremented by one in the inode of the specified file. In step 163, a record is added to the specified directory. The record includes the inode number of the inode of the specified file, and the specified file name. In step 164, if the hard link count is not greater than two, then execution continues to step 165 to create a corresponding HLDB file in the HLDB directory tree. This step is performed by invoking the file manager routine 140 as further described below with respect to FIGS. 19 and 20.

In step 164, if the hard link count is greater than two, then there should already be a corresponding HLDB file, so execution branches to step 166 to use the inode number of the specified file to find the corresponding HLDB file in the HLDB directory tree. Execution continues from step 166 to step 167. Execution also continues from step 165 to step 167.

In step 167, a directory entry add operation is used to add a record to the corresponding HLDB file. The record includes the inode number of the inode of the specified file, and a file name encoding the inode number of the specified directory and a directory cookie of the record that was added to the specified directory. After step 167, execution returns.

Figure 11:
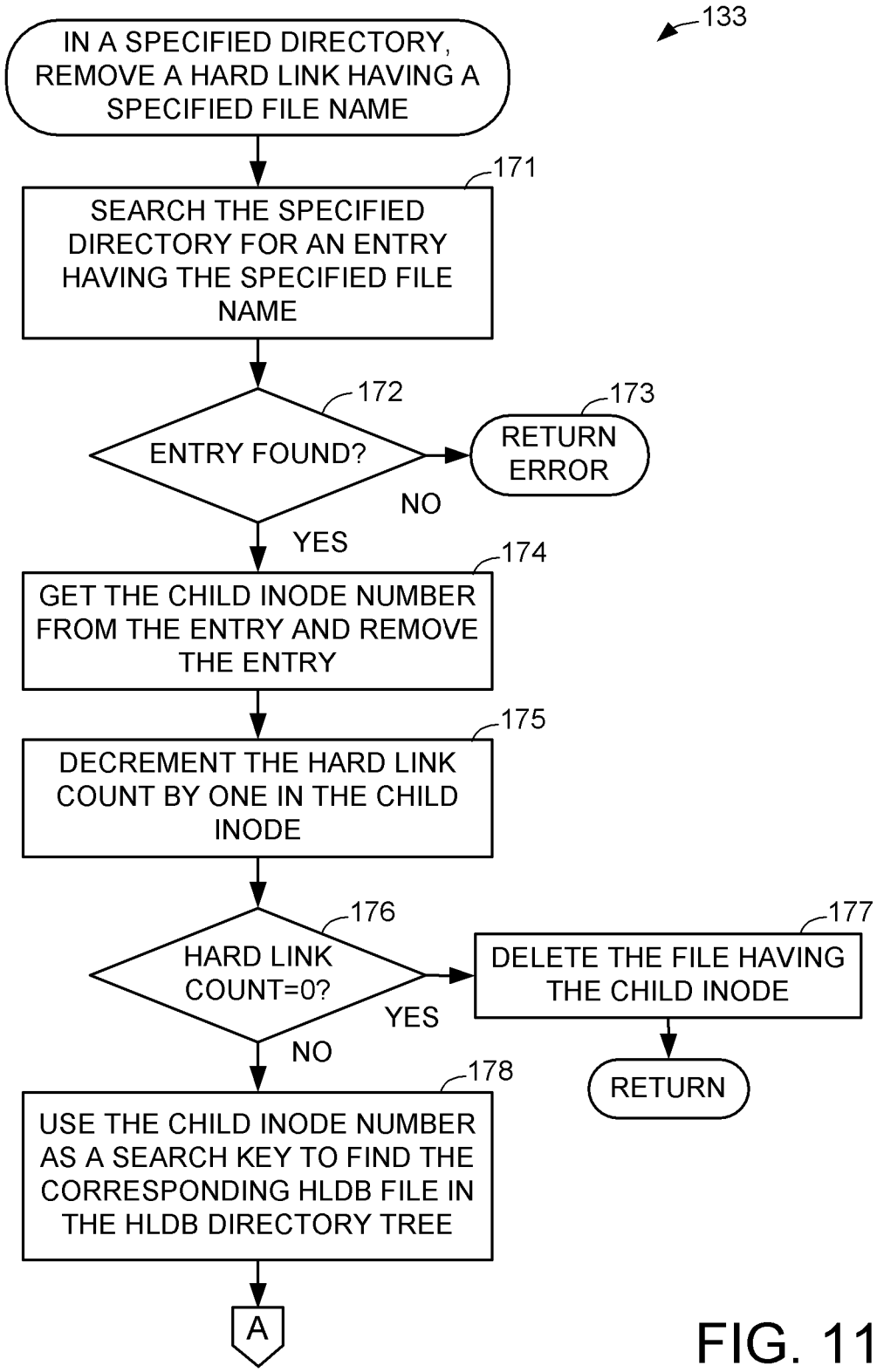
FIGS. 11 and 12 together comprise a flowchart of a file system manager routine for removing a hard link having a specified file name.
Figure 12:
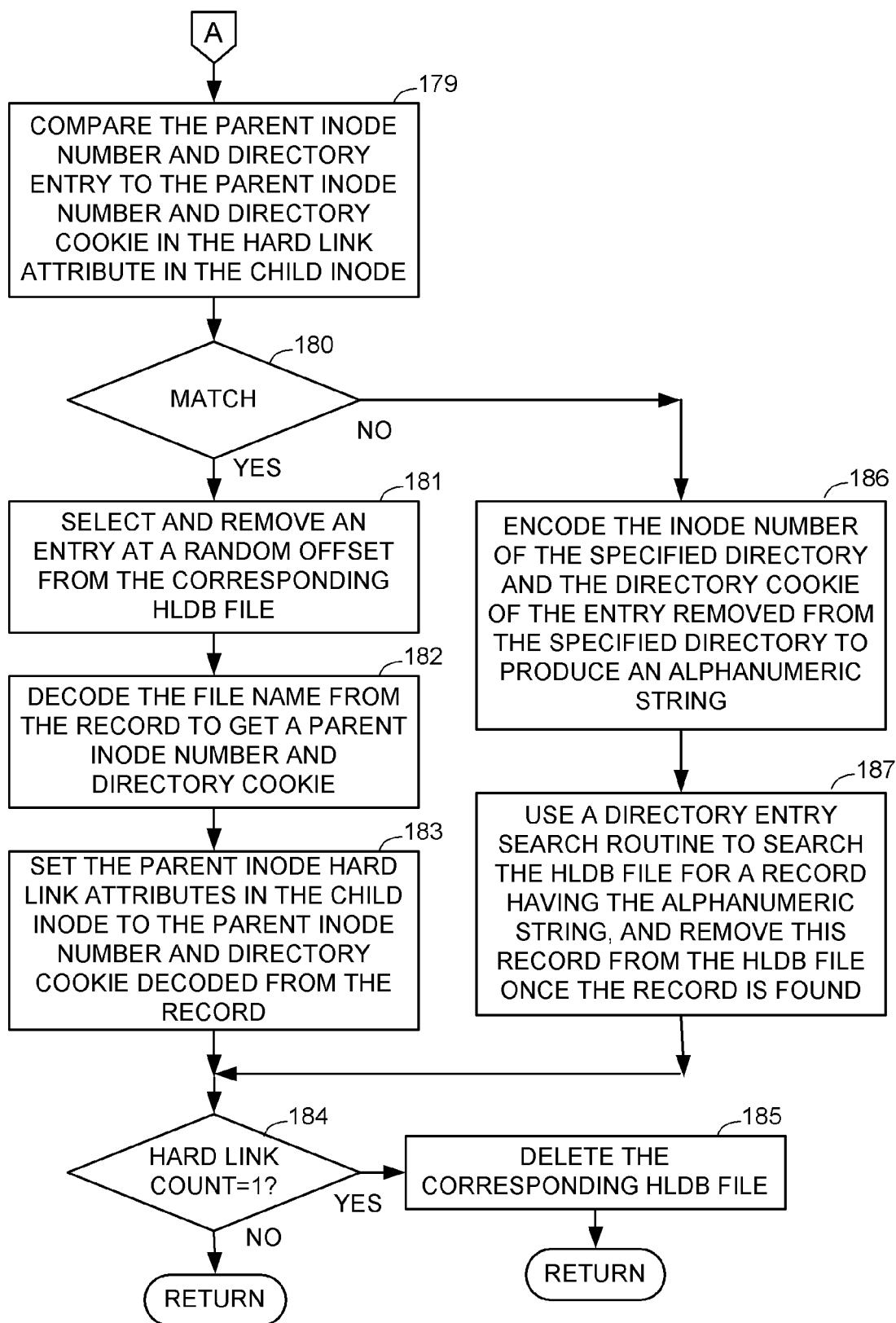

FIGS. 11 and 12 show the file system manager routine 133 for removing a hard link having a specified file name from a specified directory. In a first step 171, the specified directory is searched for an entry having the specified file name. In step 172, if such an entry is not found, then execution branches to step 173 to return an error message indicating that the specified file name was not found in the specified directory. Otherwise, if such an entry was found, then execution continues from step 172 to step 174. In step 174, the child inode number is fetched from the entry, and the entry is removed from the directory. In step 175, the hard link count is decremented by one in the child inode. In step 176, if the hard link count has been decremented to zero, then execution branches to step 177 to delete the file having the child inode, and execution returns.

In step 176, if the hard link count has not been decremented to zero, then execution continues to step 178. In step 178, the child inode number is used as a search key to find the corresponding HLDB file in the HLDB directory tree. For example, this search is performed by invoking the file system manager routine 139 as further described below with reference to FIGS. 17 and 18. Execution continues from step 178 to step 179 in FIG. 12.

In step 179 of FIG. 12, the parent inode number and directory cookie of the entry in the parent directory are compared to the parent inode number and directory cookie in the hard link attribute (57 in FIG. 2) in the child inode. In step 180, if there is a match between the parent inode numbers and a match between the directory cookies, then execution continues from step 180 to step 181. In step 181, an entry at a random offset is selected from the corresponding HLDB file, and a record is read from this entry. In step 182, the file name is decoded from this record to get a parent inode number and a directory cookie. In step 183, the parent inode attributes in the child inode are set to the parent inode number and the directory cookie decoded from the record. In step 184, if the hard link count of the child inode is not equal to one, then execution returns. Otherwise, if the hard link count of the child inode is equal to one, then execution branches to step 185 to delete the corresponding HLDB file, and then execution returns.

In step 180, if there is not a match between the parent inode numbers or between the directory cookies, then execution branches to step 186. In step 186, the inode number of the specified directory and the directory cookie of the entry removed from the specified directory are encoded to produce an alphanumeric string. In step 187, a conventional file system manager directory entry search routine (136 in FIG. 8) is used to search the HLDB file for a record having the alphanumeric string as a file name, and this record is removed from the HLDB file once the record is found. Execution continues from step 187 to step 184.

The renaming of a hard link to a file (133 in FIG. 8) includes operations similar to those shown in FIGS. 11 and 12 for the case in which the rename operation moves the hard link from a source directory to a different target directory. In this case, the file system manager routine (133 in FIG. 8) for renaming the hard link could remove the hard link from the source directory by invoking the remove routine of FIGS. 11 and 12, and then add the hard link to the target directory by invoking the add routine of FIG. 10. A more efficient way of performing the rename operation in this case is for the file system manager to rename the hard link in the conventional fashion (which moves the hard link from the source directory to the target directory), and then search for the addressing information of the original hard link in the source directory in the child inode of the regular file (as in steps 179 and 180 in FIG. 12), and if not found there, then to search for the addressing information of the original hard link in the source directory in the hard link database (as in step 178 in FIG. 11 and steps 186 and 187 in FIG. 12). Once the addressing information of the original hard link in the source directory is found in the child inode of the regular file or in the corresponding HLDB file, the addressing information is changed to address the parent inode and directory cookie of the new hard link in the target directory.

Figure 13:
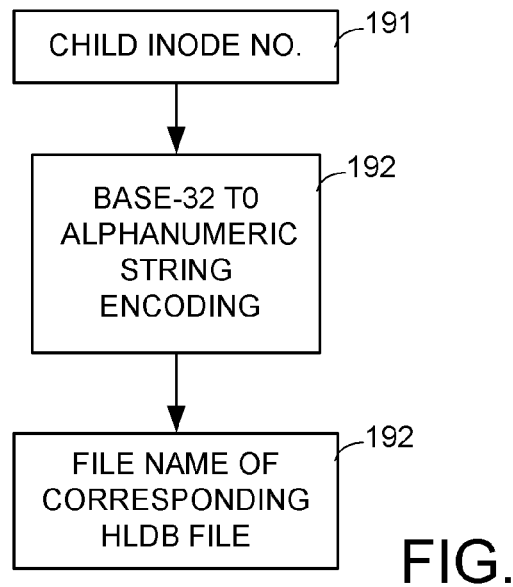
FIG. 13 is a flow diagram showing the encoding of a child inode number in the file name of a corresponding hard link database (HLDB) file.

FIG. 13 shows a preferred way of naming the HLDB file corresponding to a given regular file having more than one hard link. The child inode number 191 of the given regular file is a binary number. In step 192 this binary number is encoded into a base-32 alphanumeric string to produce the HLDB file name. For example, each base-32 digit of the binary number is encoded into an ASCII character according to the following encoding table:

| Digit | Character | ASCII Code |
|---|---|---|
| 00000 binary | "0" | 30 hex |
| 00001 binary | "1" | 31 hex |
| 00010 binary | "2" | 32 hex |
| 00011 binary | "3" | 33 hex |
| 00100 binary | "4" | 34 hex |
| 00101 binary | "5" | 35 hex |
| 00110 binary | "6" | 36 hex |
| 00111 binary | "7" | 36 hex |
| 01000 binary | "8" | 38 hex |
| 01001 binary | "9" | 39 hex |
| 01010 binary | "A" | 41 hex |
| 01011 binary | "B" | 42 hex |
| 01100 binary | "C" | 43 hex |
| 01101 binary | "D" | 44 hex |
| 01110 binary | "E" | 45 hex |
| 01111 binary | "F" | 46 hex |
| 10000 binary | "G" | 47 hex |
| 10001 binary | "H" | 48 hex |
| 10010 binary | "I" | 49 hex |
| 10011 binary | "J" | 4A hex |
| 10100 binary | "K" | 4B hex |
| 10101 binary | "L" | 4C hex |
| 10110 binary | "M" | 4D hex |
| 10111 binary | "N" | 4E hex |
| 11000 binary | "O" | 4F hex |
| 11001 binary | "P" | 50 hex |
| 11010 binary | "Q" | 51 hex |
| 11011 binary | "R" | 52 hex |
| 11100 binary | "S" | 53 hex |
| 11101 binary | "T" | 54 hex |
| 11110 binary | "U" | 55 hex |
| 11111 binary | "V" | 56 hex |

This encoding technique has the advantage of a more compact representation than encoding to a hexadecimal alphanumeric string, yet it is still compatible with virtually all file naming conventions. A routine for performing this encoding of a binary number to a base-32 alphanumeric string is further described below with reference to FIG. 21, and a routine for performing the inverse decoding is further described below with reference to FIG. 22.

Figure 14:
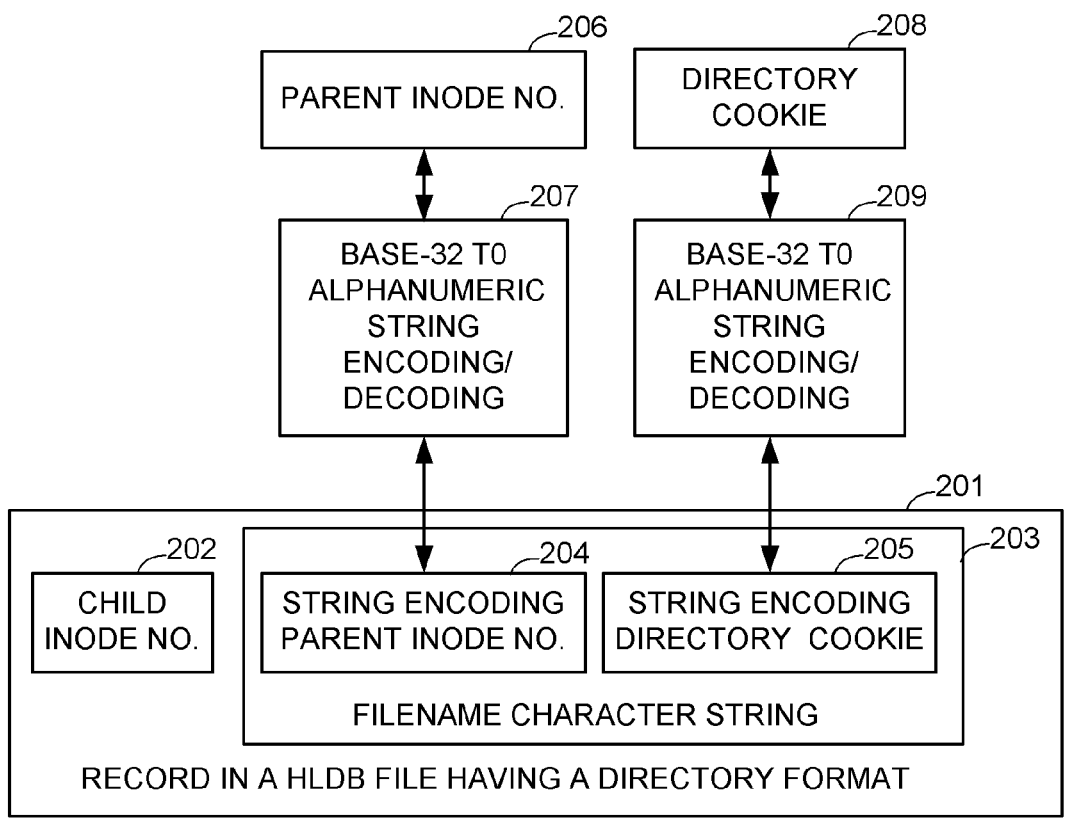
FIG. 14 is a flow diagram showing the encoding of a parent inode number and a directory cookie in a record in a HLDB file having a directory format.

FIG. 14 shows the encoding of a parent inode number 206 and a directory cookie 208 in a record 201 in a HLDB file having a directory format. The record 201 includes a child inode number 202 and a file name character string 203. The file name character string is the concatenation of a character string 204 encoding the parent inode number 206 and a character string 205 encoding the directory cookie 208. In a preferred encoding scheme, base-32 to alphanumeric string encoding/decoding 207 is used to convert between the parent inode number 206 and the string 204, and base-32 to alphanumeric string encoding/decoding 209 is used to convert between the directory cookie 208 and the string 205, as further described below with reference to FIGS. 21-22.

Figure 15:
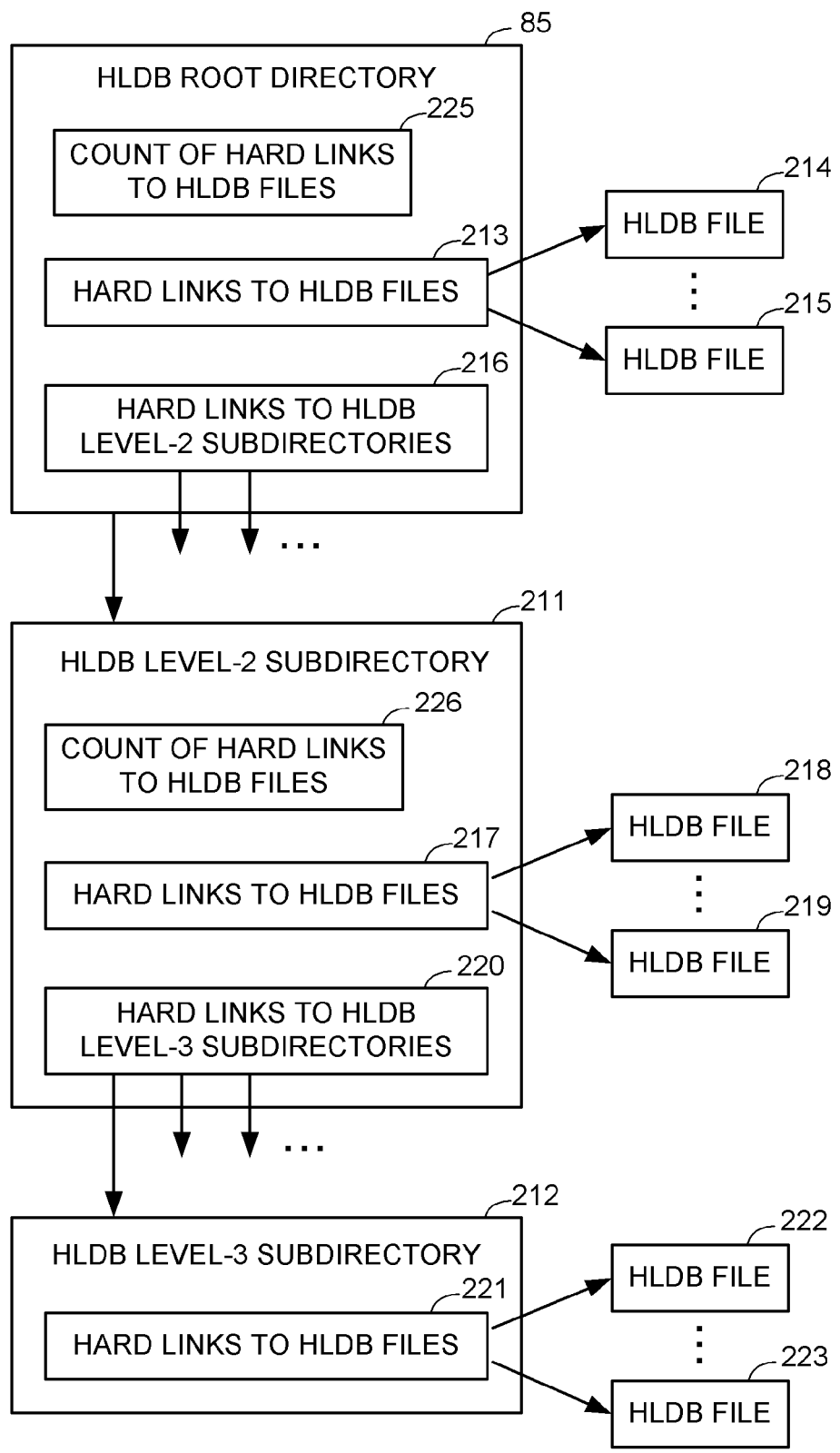
FIG. 15 is a block diagram showing a multi-level directory structure for the hard link database (HLDB)

FIG. 15 shows a preferred multi-level directory structure for the hard link database. The multi-level directory structure includes the HLDB root directory 85, a set of HLDB level-2 subdirectories 211, and a set of HLDB level-3 subdirectories 212. The multi-level directory structure provides a multi-level hash structure in which the level-2 and level-3 subdirectories each contain a hash list of HLDB file names having the same hash value. The multi-level hash structure provides storage space efficiency when there are few regular files having multiple hard links and therefore few HLDB files, and for lookup efficiency when there are many HLDB files. Every HLDB file is named from the inode number of its corresponding regular file, and every HLDB name is encoded in base-32 alphanumeric representation for compactness.

For example, the HLDB root directory 85 contains hard links 213 to HLDB files 214, 215, and hard links 216 to HLDB level-2 subdirectories, such as a first HLDB level-2 subdirectory 211. The HLDB root directory 85 also has an attribute 225 storing a count of the hard links 213 to the HLDB files, so that when the count reaches a certain maximum number, no more hard links to HLDB files are added to the HLDB root directory. Instead, if it is desired to add a new HLDB file to the HLDB database and the count 225 indicates the maximum number, a hard link to the new HLDB file is added to a lower level-2 or level-3 subdirectory.

The certain maximum number of hard links 213 to HLDB files, for example, is chosen so that a certain small directory size having no more than a few file system data blocks may contain the certain maximum number of hard links 213 to HLDB files, and may also contain the certain maximum number of hard links 216 to HLDB level-2 subdirectories. For example, for the case of a small file system, the HLDB root directory has a single four kilobyte file system data block storing a maximum of 256 directory entries, and the certain maximum number of hard links 213 to HLDB files is 128, and the certain maximum number of hard links 216 to HLDB level-2 subdirectories is also 128. The maximum number of hard links 216 to HLDB level-2 subdirectories is used when hashing the child inode number to compute a hash value for selecting a particular one of the HLDB level-2 subdirectories in order to continue a search for a hard link to the corresponding HLDB file when such a hard link is not found in the HLDB root directory.

A HLDB level-2 subdirectory 211 has the same format as the HLDB root directory. In particular, it has hard links 217 to HLDB files 218, 219, and hard links 220 to HLDB level-3 subdirectories, and a count 226 of hard links to HLDB files. Given a certain maximum number of inodes in the file system, the size of the HLDB root directory and the size of the HLDB level-2 subdirectory can be chosen so that there is no need for HLDB subdirectories below the level-3 subdirectories. In this case, a HLDB level-3 subdirectory 212 will never be much larger than the size of the HLDB root directory as the level-3 subdirectory becomes filled with hard links to HLDB files 222, 223. In particular, the maximum number of hard links 212 to HLDB files in the HLDB level-3 subdirectory 212 is no more than the maximum number of inodes in the file system divided by the product of the maximum number of hard links 216 to HLDB level-2 subdirectories and the maximum number of hard links 220 to HLDB level-3 subdirectories.

Figure 16:
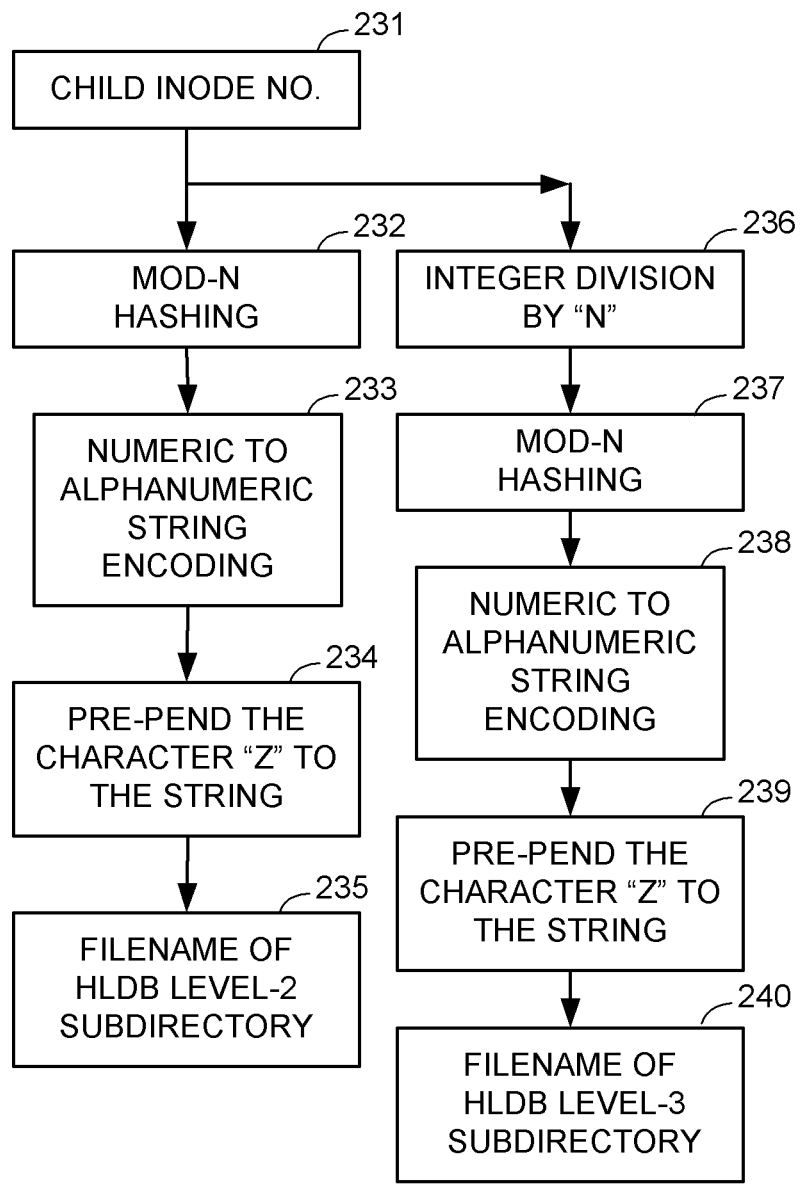
FIG. 16 is a flow diagram showing multi-level hashing of a child inode number for lookup of a corresponding HLDB file in the multi-level directory structure of FIG. 15.

FIG. 16 shows the multi-level hashing of a child inode number 231 for the case of a maximum number of "N" hard links in the HLDB root directory and in the HLDB level-2 subdirectory. A mod-N hashing 232 of the child inode number 231 followed by numeric to alphanumeric string encoding 233 and pre-pending 234 the character "Z" produces the filename 235 of a particular HLDB level-2 subdirectory. A beginning character of "Z" in the file name distinguishes the file name of a HLDB level-2 or level-3 subdirectory from the file name of a HLDB file. For example, a mod-N hashing is performed by calculating the remainder of an integer division of the inode number by "N", and the numeric to alphanumeric string encoding is performed by the base-32 conversion routine 141 further described below with respect to FIG. 21. The filename 240 of a HLDB level-3 subdirectory is computed from the child inode number 231 by an integer division 236 by "N" followed by a mod-N hashing 237 and a numeric to alphanumeric string encoding 238 and pre-pending 239 the character "Z".

Figure 17:
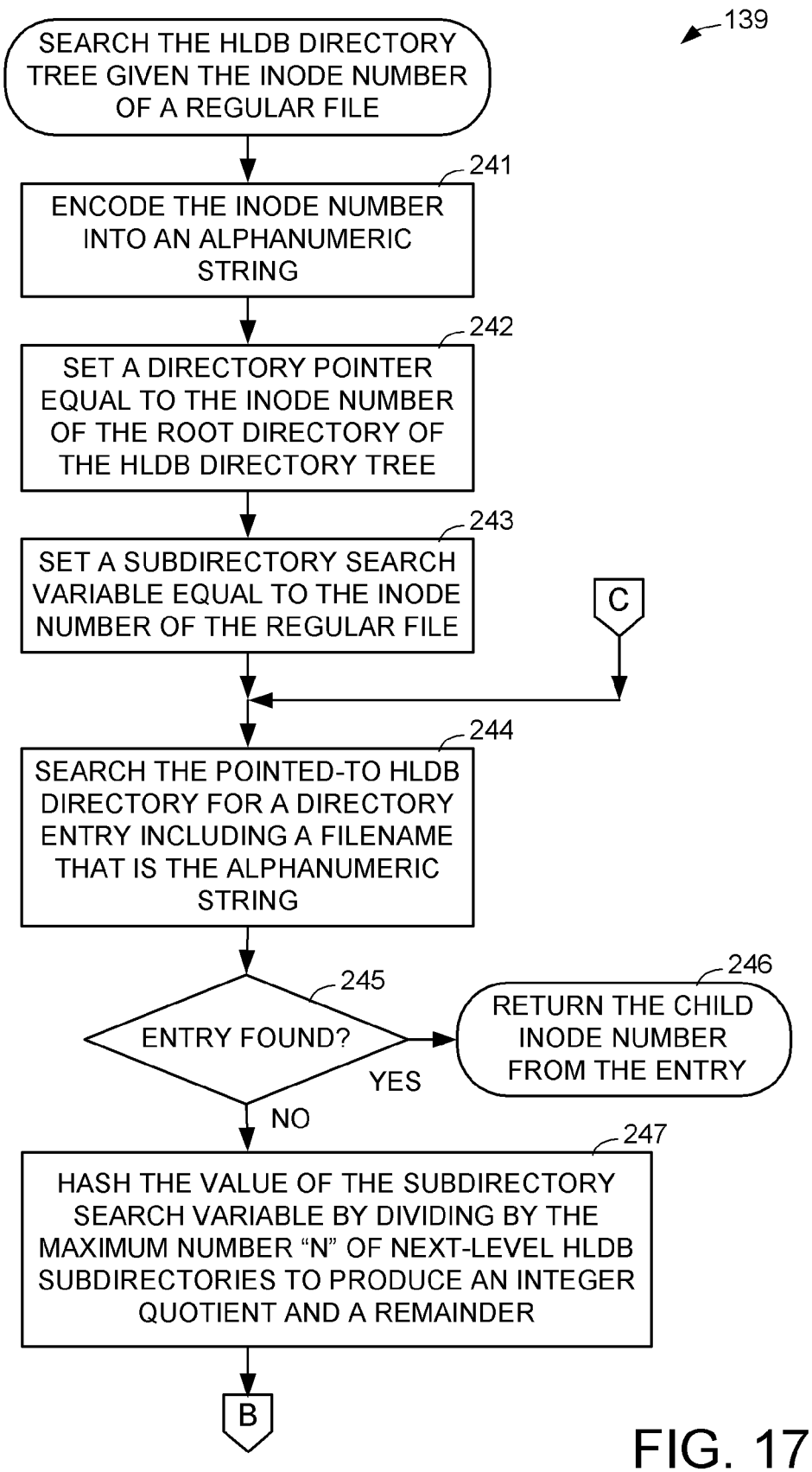
FIGS. 17 and 18 together comprise a flowchart of a file system manager routine for searching the HLDB directory tree given the inode number of a regular file.
Figure 18:
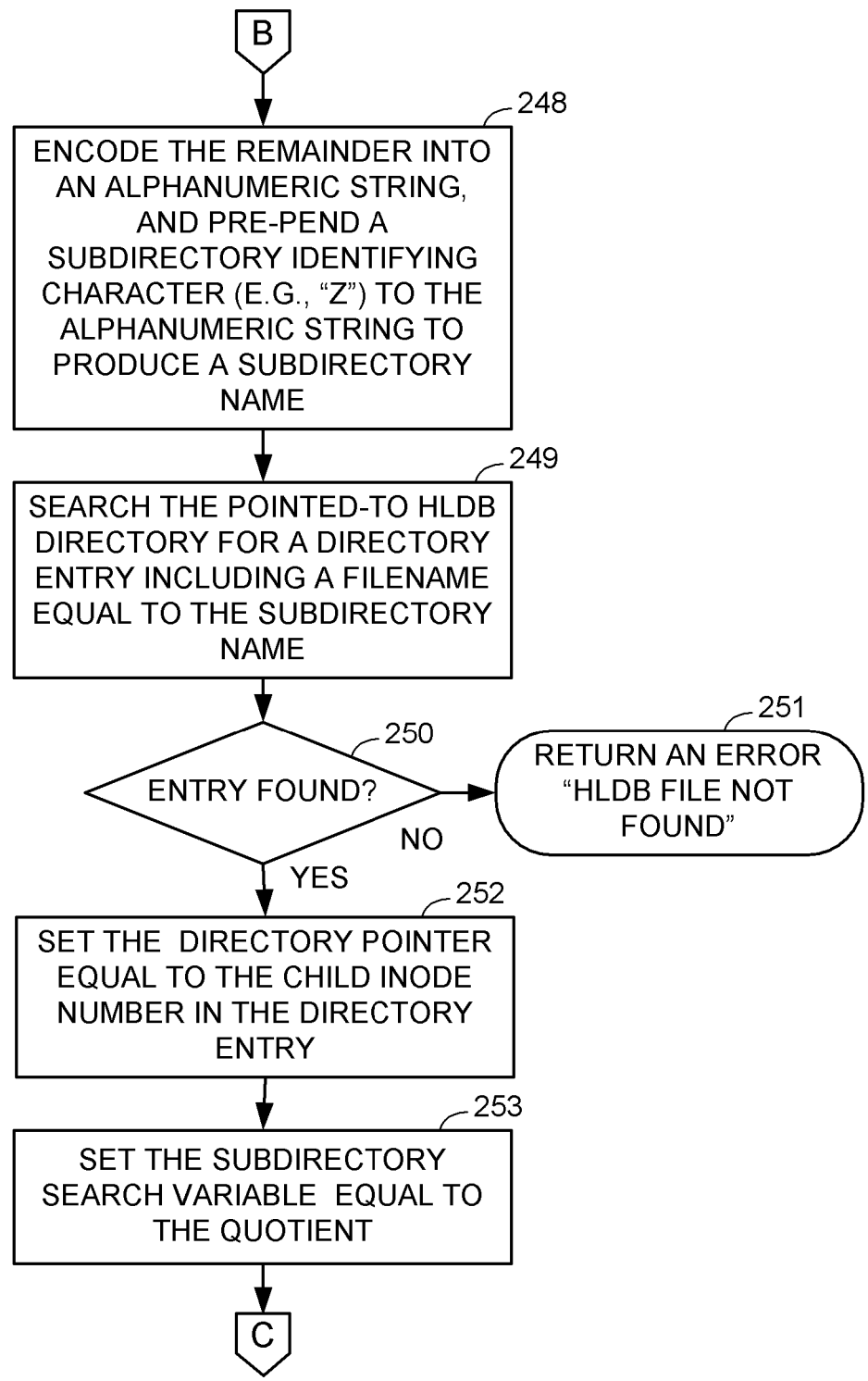

FIGS. 17 and 18 show details of the file system manager routine 139 for searching the HLDB directory tree given the inode number of a regular file. In a first step 241 the inode number is encoded into an alphanumeric string to produce the file name of the corresponding HLDB file. In step 242 a directory pointer is set equal to the inode number of the root directory of the HLDB directory tree. In step 243 a subdirectory search variable is set equal to the inode number of the regular file.

In step 244, the pointed-to HLDB directory is searched for a directory entry including a filename that is the alphanumeric string. In step 245, if such a directory entry is found, then execution branches to step 246 to return the child inode number from this directory entry. This child inode number is the inode number of the corresponding HLDB file.

In step 245, if such a directory entry is not found, then execution continues to step 247. In step 247, the value of the subdirectory search variable is hashed by dividing by the maximum number "N" of next-level subdirectories to produce an integer quotient and a remainder. Execution continues from step 247 to step 248 in FIG. 18. In step 248, an HLDB subdirectory name is produced by encoding the remainder into an alphanumeric string and pre-pending a subdirectory identifying character (e.g., "Z") to the alphanumeric string. In step 249, the pointed-to HLDB directory is searched for a directory entry including a filename equal to the subdirectory name. In step 250, if such a directory entry is not found, then execution branches to step 251 to return an error message indicating that the corresponding HLDB file was not found. Otherwise, if such a directory entry is found, then execution continues from step 250 to step 252. In step 252, the directory pointer is set equal to the child inode number in the directory entry. In step 253, the subdirectory search variable is set equal to the quotient. Execution loops from step 253 back to step 244 of FIG. 17 to continue the search in the lower-level HLDB subdirectory indicated by the directory pointer.

Figure 19:
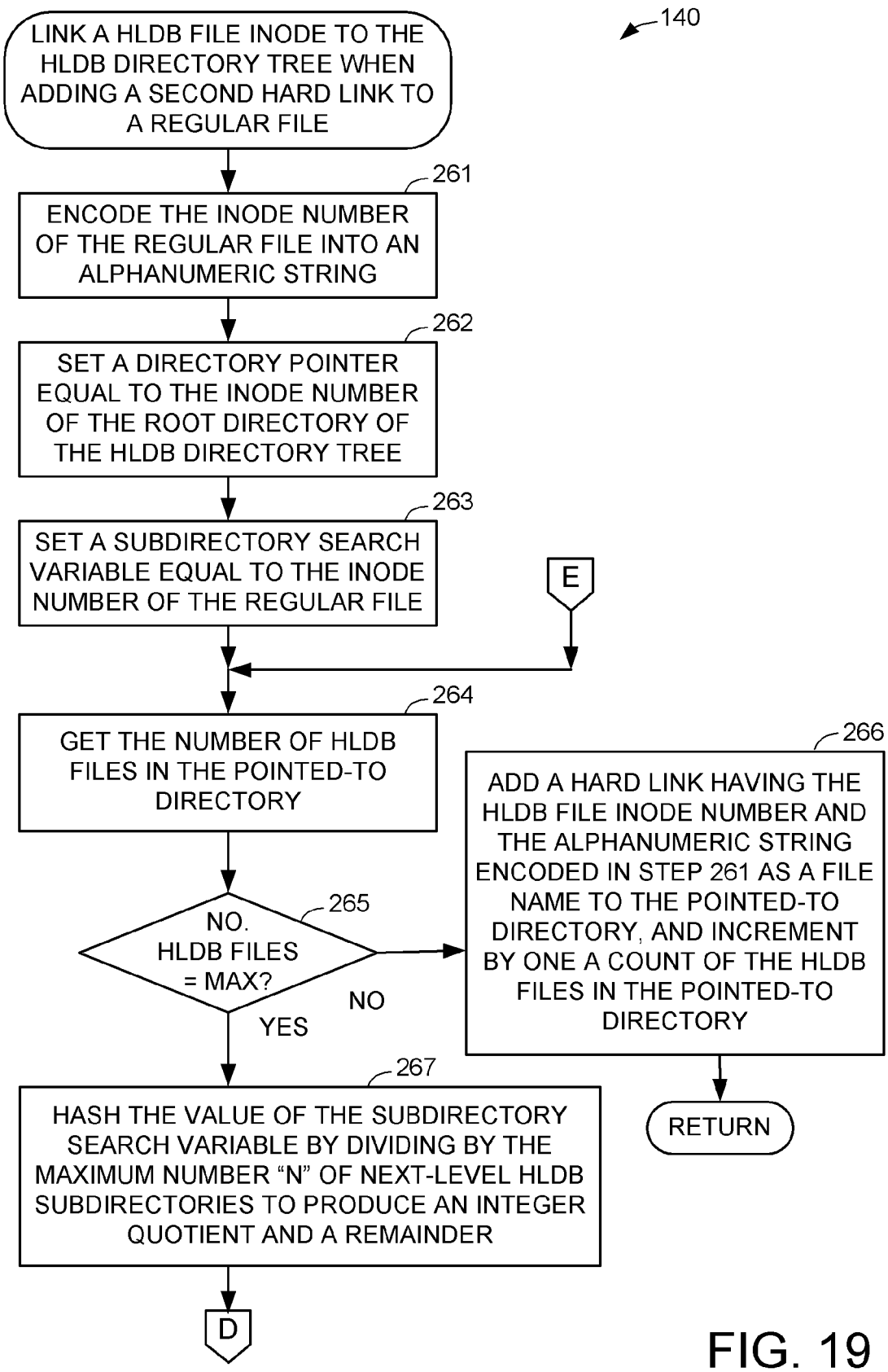
FIGS. 19 and 20 together comprise a flowchart of a file system manager routine for linking a HLDB file inode to the HLDB directory tree when adding a second hard link to a regular file.
Figure 20:
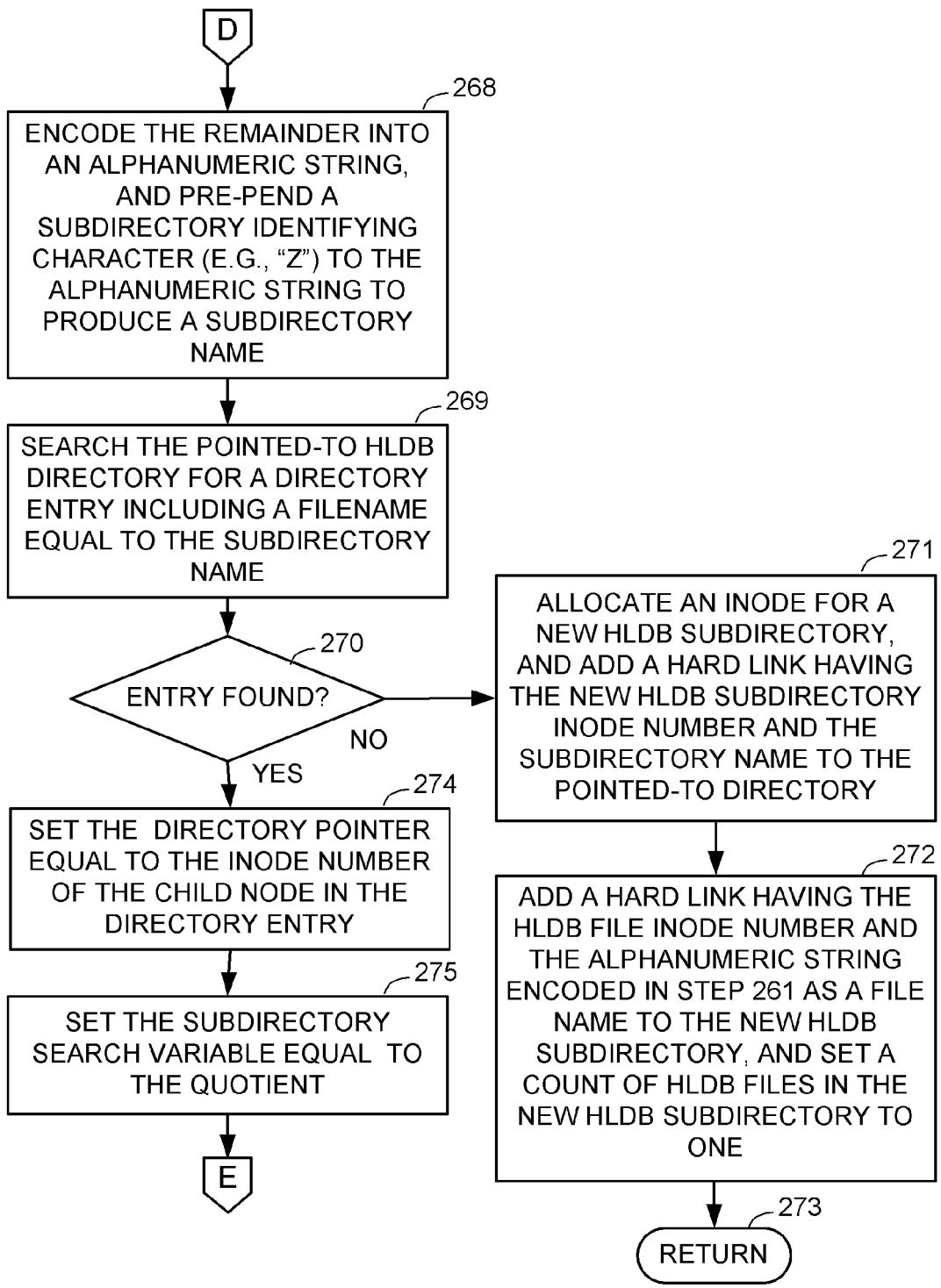

FIGS. 19 and 20 show details of the file system manager routine 140 for linking a HLDB file inode to the HLDB directory tree when adding a second hard link to a regular file. In a first step 261, the inode number of the regular file is encoded into an alphanumeric string, as described above with respect to FIG. 13. In step 262, a directory pointer is set equal to the inode number of the root directory of the HLDB directory tree. In step 263, a subdirectory search variable is set equal to the inode number of the regular file.

In step 264, the number of HLDB files in the pointed-to directory is fetched from the file count attribute in the inode of the pointed-to directory. In step 265, if the number of HLDB files is not equal to the maximum number (MAX), then execution branches to step 266. In step 266, a new hard link is added to the pointed-to directory. The new hard link has a child inode number set equal to the HLDB file inode number, and the new hard link has a file name set equal to the alphanumeric string that was encoded in step 261. Also the count of HLDB files in the pointed-to directory is incremented by one. After step 266, execution returns.

In step 265, if the number of HLDB files in the pointed-to directory is equal to the maximum number (MAX), then execution continues from step 265 to step 267. In step 267 the value of the subdirectory search variable is hashed by dividing by the maximum number "N" of next-level HLDB subdirectories to produce an integer quotient and a remainder. Execution continues from step 267 to step 268 in FIG. 20.

In step 268 in FIG. 20, the remainder is encoded into an alphanumeric string, and a subdirectory identifying character (e.g., "Z") is pre-pended to the alphanumeric string to produce a subdirectory name. In step 269, the pointed-to HLDB directory is searched for a directory entry including a filename equal to the subdirectory name. In step 270, if such a directory entry is not found, then execution branches to step 271. In step 271, a new inode is allocated for a new HLDB subdirectory, and a new hard link is added to the pointed-to directory. The new hard link has a child inode number set equal to the inode number of the new HLDB subdirectory, and a file name set equal to the subdirectory name produced in step 268. In step 272, a new hard link is added to the new HLDB subdirectory. This new hard link has a child inode number set equal to the HLDB file inode number, and a file name set equal to the alphanumeric string produced in step 261. Also the count of HLDB files in the inode of the new HLDB subdirectory is incremented by one. After step 266, execution returns.

In step 270, if a directory entry is found that includes a file name equal to the subdirectory name, then execution continues to step 274. In step 274, the directory pointer is set equal to the inode number of the child inode number in the directory entry. In step 275, the subdirectory search variable is set equal to the quotient computed in step 267. Execution loops from step 275 back to step 264 in FIG. 19.

Figure 21:
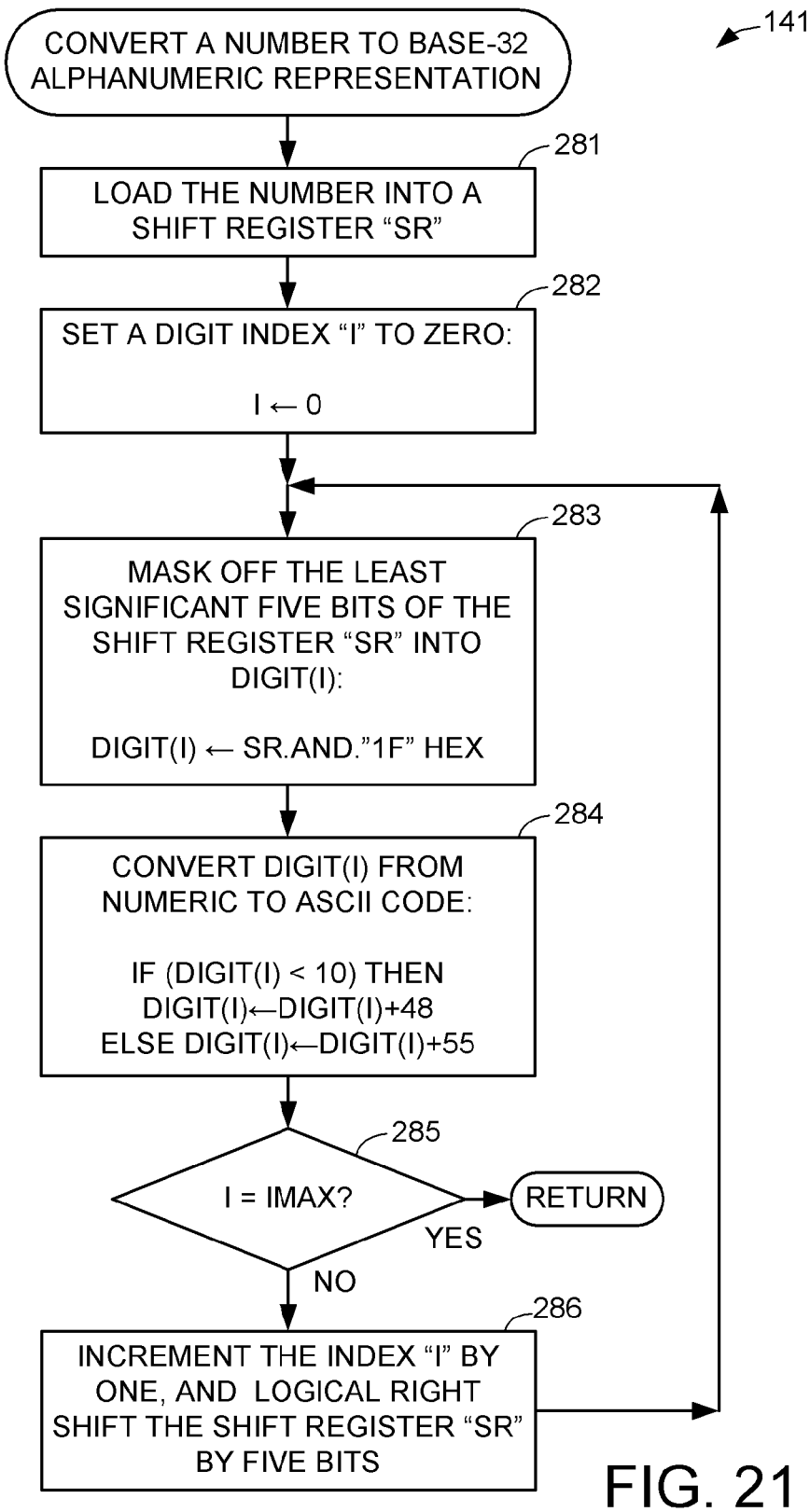
FIG. 21 is a flowchart of a file system manager routine for converting a number to base-32 alphanumeric representation.

FIG. 21 shows details of the file system manager routine 141 for converting a number to base-32 alphanumeric representation. In this case the number is an unsigned integer binary number. In a first step 281, the number is loaded into a shift register "SR". In step 282, a digit index "I" is set equal to zero. In step 283, the least significant five bits of the shift register "SR" are masked off the least significant byte of "SR" and loaded into the "I"th digit of a digit array. In step 284, the "I"th digit of the digit array is converted from a numeric value to ASCII code. In particular, if the numeric value of the "I"th digit is less than ten, then the numeric value of the "I"th digit is incremented by forty-eight; otherwise, the numeric value of the "I"th digit is incremented by fifty-five. In step 285, if the digit index is equal to a maximum value (IMAX), then execution returns. Otherwise, execution continues to step 286. In step 286, the digit index is incremented by one, and the shift register "SR" is logic right shifted by five bits. Execution loops from step 286 back to step 283.

Figure 22:
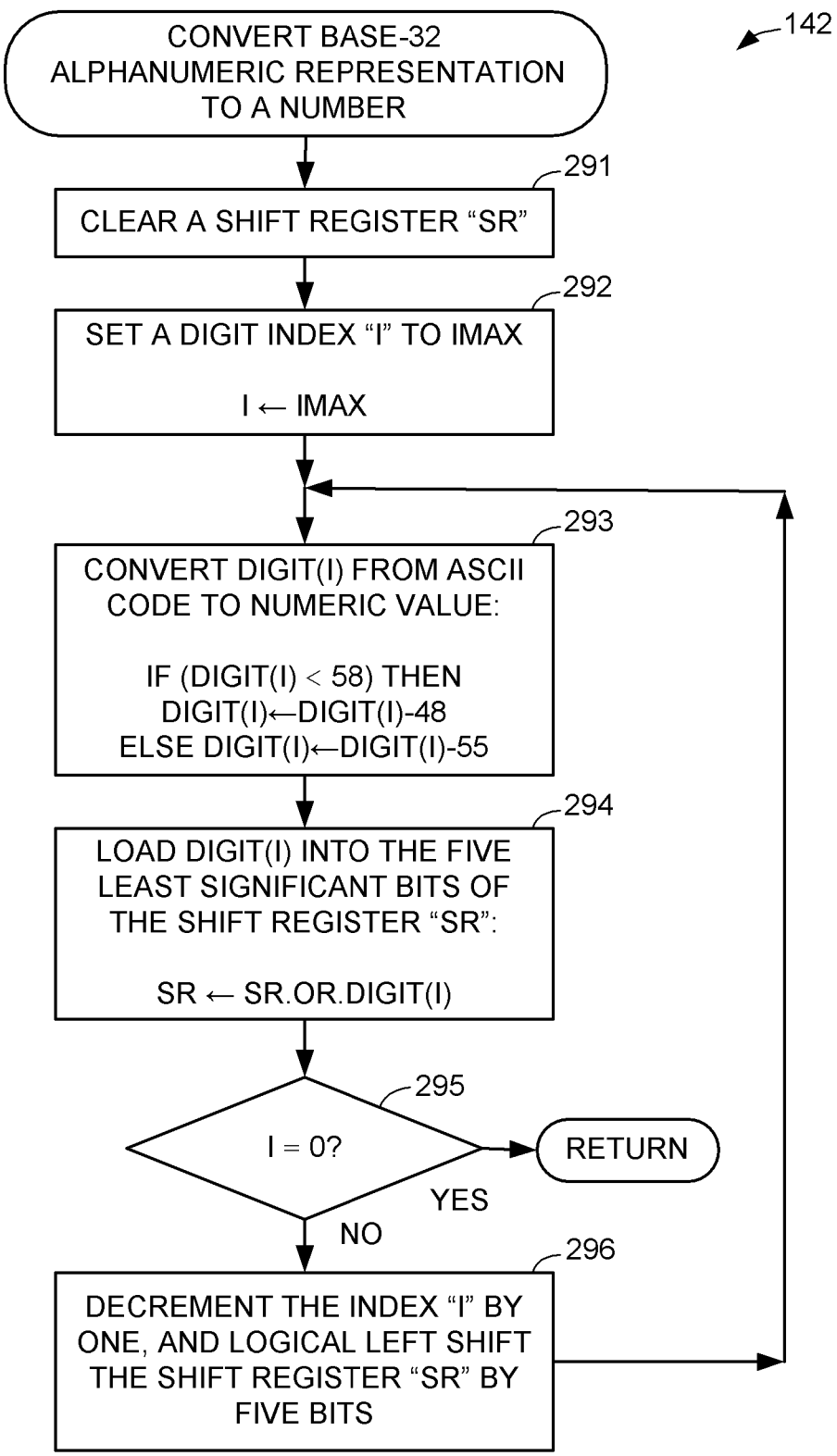
FIG. 22 is a flowchart of a file system manager routine for converting a base-32 alphanumeric representation to a number.

FIG. 22 shows details of the file system manager routine 142 for converting a base-32 alphanumeric representation to a number. In a first step 291, a shift register "SR" is cleared. In step 292, the digit index "I" is set equal to the maximum value (IMAX). In step 293, the "I"th digit in the digit array is converted from ASCII code to a numeric value. In particular, if the "I"th digit has a value less than fifty-eight, then the value of the "I"th digit is decremented by forty-eight; otherwise, the value of the "I"th digit is decremented by fifty-five. In step 294, the "I"th digit is loaded into the five least significant bits of the shift register "SR". In step 295, if the digit index "I" has a value of zero, then execution returns. In this case, the string of alphanumeric characters in the digit array has been converted to the numeric value in the shift register "SR". Otherwise, if the digit index "I" is not equal to zero, then execution continues from step 295 to step 296. In step 296, the digit index "I" is decremented by one, and the shift register "SR" is logical left shifted by five bits. Execution loops from step 296 back to step 293.

Figure 23:
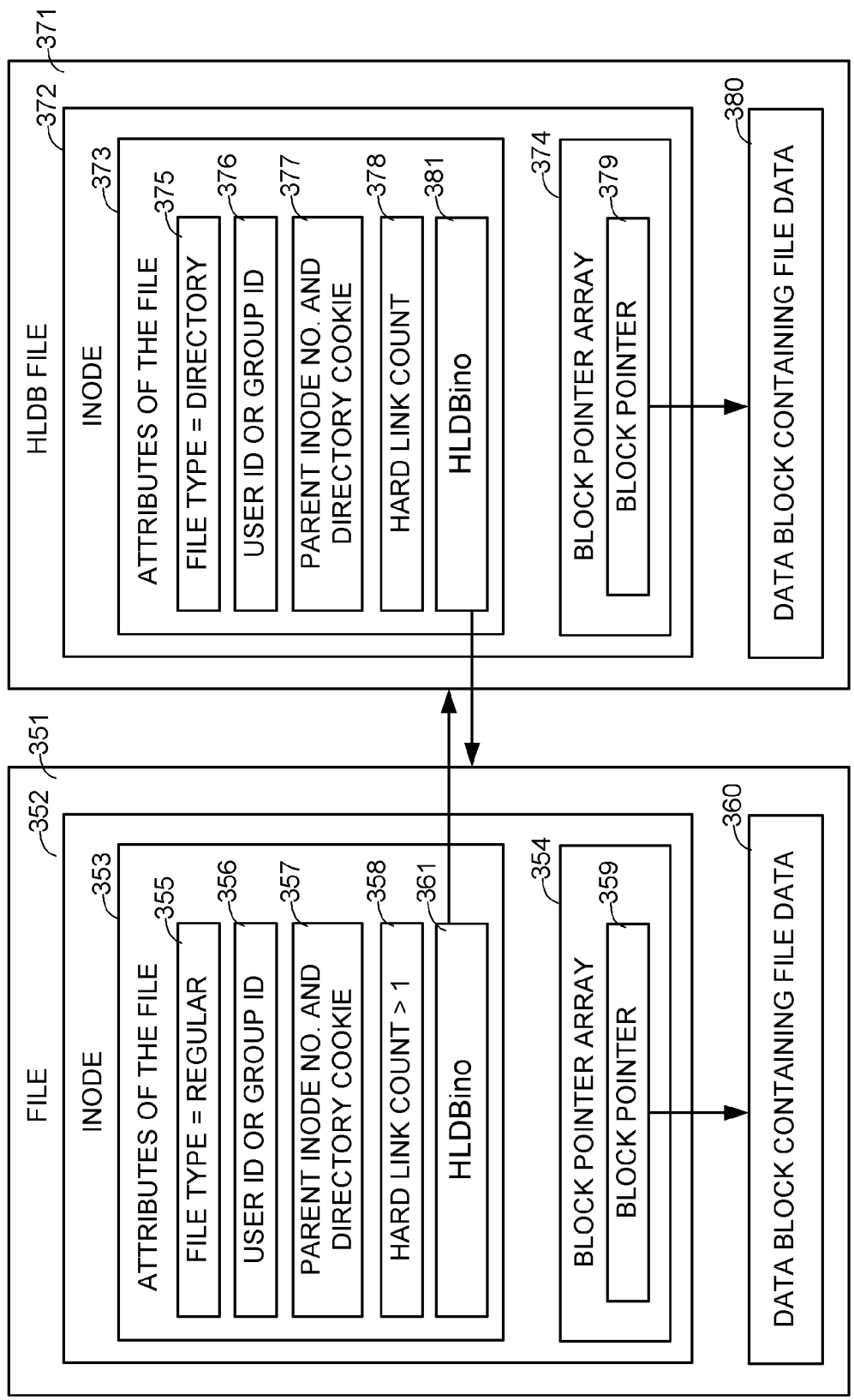
FIG. 23 is an alternative arrangement for organizing the HLDB files in which each regular file having a hard link count greater than one is doubly-linked to its corresponding HLDB file.

FIG. 23 shows an alternative organization for the HLDB files in which each regular file having a hard link count greater than one is doubly linked to its corresponding HLDB file. This alternative organization has the advantage of eliminating the storage and processing overhead of maintaining the HLDB root directory and the HLDB directory tree. However, this alternative organization requires an additional file attribute entry for linking each regular file having a hard link count greater than one to its corresponding HLDB file.

For example, FIG. 23 shows a regular file 351 having an inode 352 containing file attributes 353 and a block pointer array 354. The file attributes 353 include a file type 355 indicating a regular file, a user ID or group ID 356, a parent inode number and directory cookie 357, a hard link count 358 greater than one, and a new file attribute 361 called "HLDBino" for storing the inode number of a corresponding HLDB file 371. The block pointer array 354 includes at least one block pointer 359 pointing to a data block 360 containing file data.

The corresponding HLDB file 371 has a structure similar to its regular file 351. The HLDB file has an inode 372 containing file attributes 373 and a block pointer array 374. The file attributes include a file type 375 indicating a directory, a user ID or group ID 376, a parent inode number and directory cookie 377, a hard link count 378, and a "HLDBino" entry 381. The block pointer array 374 includes at least one block pointer 379 pointing to a data block 380 containing file data.

In the preferred organization of FIG. 23, there is no HLDB root directory and the HLDB files do not appear in the namespace of the file system. Nor are there any hard links to the HLDB files in any parent directories. Instead, each and every HLDB file is located solely by the link from the "HLDBino" entry in the corresponding regular file having a hard link count greater than zero. For example, the user ID or Group ID 376, the parent inode no. and directory cookie 377, and the hard link count 378 in the HLDB file 371 are void of meaningful content.

The "HLDBino" entry 381 in each HLDB file 371 points back to its corresponding regular file 351 by containing the inode number of the corresponding regular file 351. Moreover, every directory that is not an HLDB file in the file system has its "HLDBino" entry set to zero. This permits the HLDB files to be distinguished from the other directories during a scan of the inodes in the file system during recovery after a crash and re-boot.

In view of the above, a file system manager of a file server maintains a hard link database (HLDB) for enabling a fast reverse lookup of parent directories storing records of hard links to a specified regular file. The hard link database stores information for addressing hard links to the regular files having multiple hard links. The hard link database contains a respective HLDB file for each regular file having multiple hard links so that there is a one-to-one correspondence between each of the regular files having multiple hard links and each of the HLDB files. In a preferred implementation, the inode of each regular file stores the addressing information for one hard link to the regular file, a corresponding HLDB file stores the addressing information for other hard links to the regular file, each HLDB file is a directory accessed by invoking file system manager directory access routines, and the hard link database has a directory tree providing a multi-level hash index for searching the hard link database for a HLDB file corresponding to a given inode number of a regular file. This provides a hard link database that is efficient for storing and searching for the hard link addressing information for a given regular file in a file system that has either just a few or very many regular files having multiple hard links. Such a hard link database is built on the existing file system management infrastructure so as to exploit the conventional file system recovery capabilities (such as the UNIX "fsck" utility) in case of a system crash, and the hard link database maintenance and search routines are designed with little modification to the conventional file system manager routines so that the hard link database is portable with the file system during replication or migration or upgrade to future file system versions.

What is claimed is:

1. A method of operating a file server, the file server having data storage storing a file system, a data processor coupled to the data storage for access to files in the file system, and non-transitory computer readable storage medium coupled to the data processor and storing computer instructions, and the file system including a hierarchy of directories and regular files that are not directories, the directories containing records of hard links to the regular files, each of some of the regular files having multiple hard links, each of the hard links including a respective file name, and the data storage storing a hard link database, the hard link database including hard link database files, there being a one-to-one correspondence between said each of the regular files having multiple hard links and each of the hard link database files, and each of the hard link database files storing one or more records of addressing information for addressing one or more of the hard links to the corresponding one of the regular files having multiple hard links, each hard link database file of the hard link database being organized in a directory format, each hard link database file of the hard link database being inaccessible to a user of the data storage, a hard link database file associated with a regular file including information regarding one or more hard links to the regular file other than one hard link included in an attribute of an inode of the regular file, and the computer instructions, when executed by the data processor, performing the steps of:

(a) maintaining the one-to-one correspondence between said each of the regular files having multiple hard links and said each of the hard link database files by adding and deleting corresponding hard link database files in the hard link database and adding and deleting records in the corresponding hard link database files in response to adding and removing multiple hard links to regular files in the file system; and (b) performing a reverse lookup of parent directories storing records of hard links to a specified regular file having multiple hard links by determining the number of hard links from an attribute of an inode of the specified regular file, based on the number of hard links, accessing the corresponding one of the hard link database files to read addressing information from records in the corresponding one of the hard link database files, and using the addressing information read from the records in the corresponding one of the hard link database files to address the records of hard links to the specified regular file having multiple hard links.

2. The method as claimed in claim 1, wherein the reverse lookup is performed in response to an occurrence of an exception with respect to the specified regular file having multiple hard links, and the method further includes notifying users of the parent directories of the occurrence of the exception, and providing a system administrator with a listing of the file names included in the hard links to the specified file having multiple hard links.

3. The method as claimed in claim 1, wherein the reverse lookup is performed in order to delete the hard links to the specified file having multiple hard links, and the method includes deleting the hard links to the specified file having multiple hard links.

4. The method as claimed in claim 1, wherein each regular file in the file system contains an attribute providing addressing information for addressing the record of one hard link to each regular file in the file system, and each hard link database file contains records for hard links other than the one hard link to the corresponding regular file addressed by the addressing information provided by the attribute contained in the corresponding regular file.

5. The method as claimed in claim 1, wherein the addressing information in each record of each hard link database file includes an inode number and a directory cookie, and the inode number and the directory cookie are encoded in a character string in said each record of each hard link database file.

6. The method as claimed in claim 5, wherein said each record of each hard link database file further includes an inode number of the corresponding regular file having multiple hard links.

7. The method as claimed in claim 1, wherein the hard link database files are directories, and the method includes creating, reading, and deleting records in the hard link database files by invoking file system manager routines for creating, reading, and deleting hard links in directories.

8. The method as claimed in claim 1, wherein the hard link database files are leaf nodes in a hard link database directory tree, each hard link database file has a respective file name in the hard link database directory tree, and the respective file name of each hard link database file is a character string encoding an inode number of the corresponding regular file having multiple hard links, and the method includes searching the hard link database to find the hard link database file corresponding to the specified regular file having multiple hard links by searching the hard link database directory tree to find the file name of the hard link database file corresponding to the specified regular file having multiple hard links.

9. The method as claimed in claim 1, wherein the hard link database includes a hard link database directory tree, the hard link database files are leaf nodes in the hard link database directory tree, the hard link database directory tree includes a root directory and lower-level subdirectories, and the lower-level subdirectories have file names that encode different hash values of the inode numbers of the regular files in the file system so that the root directory and intermediate subdirectories of the hard link directory tree provide a multi-level hash index, and the method further includes searching the hard link directory tree given an inode number of the specified regular file having multiple hard links by hashing the inode number to produce a character string and then using the character string to search for the file name of one of the lower-level subdirectories and then searching said one of the lower-level subdirectories to find a file name of the hard link database file corresponding to the specified regular file having multiple hard links.

10. The method as claimed in claim 1, wherein said each of the regular files having multiple hard links has an attribute containing a pointer to the corresponding one of the hard link database files, and the method includes accessing the attribute containing the pointer to the corresponding one of the hard link database files in the specified regular file having multiple hard links in order to access the corresponding one of the hard link database files when performing the reverse lookup of parent directories storing records of hard links to the specified regular file having multiple hard links.

11. A file server comprising:
data storage containing a file system;
a data processor coupled to the data storage for access to files in the file system; and non-transitory computer readable storage medium coupled to the data processor and storing computer instructions, and the file system including a hierarchy of directories and regular files that are not directories, the directories containing records of hard links to the regular files, each of some of the regular files having multiple hard links, each of the hard links including a respective file name, and the data storage containing a hard link database, the hard link database including hard link database files, there being a one-to-one correspondence between said each of the regular files having multiple hard links and each of the hard link database files, and each of the hard link database files containing one or more records of addressing information for addressing one or more of the hard links to the corresponding one of the regular files having multiple hard links, each hard link database file of the hard link database being organized in a directory format, each hard link database file of the hard link database being inaccessible to a user of the data storage, a hard link database file associated with a regular file including information regarding one or more hard links to the regular file other than one hard link included in an attribute of an inode of the regular file, and the computer instructions, when executed by the data processor, perform the steps of:

(a) maintaining the one-to-one correspondence between said each of the regular files having multiple hard links and said each of the hard link database files by adding and deleting corresponding hard link database files in the hard link database and adding and deleting records in the corresponding hard link database files in response to adding and removing multiple hard links to regular files in the file system; and (b) performing a reverse lookup of parent directories storing records of hard links to a specified regular file having multiple hard links by determining the number of hard links from an attribute of an inode of the specified regular file, based on the number of hard links, accessing the corresponding one of the hard link database files to read addressing information from records in the corresponding one of the hard link database files, and using the addressing information read from the records in the corresponding one of the hard link database files to address the records of hard links to the specified regular file having multiple hard links.

12. The file server as claimed in claim 11, wherein each regular file in the file system contains an attribute providing addressing information for addressing the record of one hard link to each regular file in the file system, and each hard link database file contains records for hard links other than the one hard link to the corresponding regular file addressed by the addressing information provided by the attribute contained in the corresponding regular file.

13. The file server as claimed in claim 11, wherein the addressing information in each record of each hard link database file includes an inode number and a directory cookie, and the inode number and the directory cookie are encoded in a character string in said each record of each hard link database file.

14. The file server as claimed in claim 13, wherein said each record of each hard link database file further includes an inode number of the corresponding regular file having multiple hard links.

15. The file server as claimed in claim 11, wherein the hard link database files are directories, and the computer instructions, when executed by the data processor, invoke file system manager routines for creating, reading, and deleting records in directories in order to create, read, and delete records in the hard link database files.

16. The file server as claimed in claim 11, wherein the hard link database files are leaf nodes in a hard link database directory tree, each hard link database file has a respective file name in the hard link database directory tree, and the respective file name of each hard link database file is a character string encoding an inode number of the corresponding regular file having multiple hard links, and the computer instructions, when executed by the data processor, search the hard link database to find the hard link database file corresponding to the specified regular file having multiple hard links by searching the hard link database directory tree to find the file name of the hard link database file corresponding to the specified regular file having multiple hard links.

17. The file server as claimed in claim 11, wherein the hard link database includes a hard link database directory tree, the hard link database files are leaf nodes in the hard link database directory tree, the hard link database directory tree includes a root directory and lower-level subdirectories, and the lower-level subdirectories have file names that encode different hash values of the inode numbers of the regular files in the file system so that the root directory and intermediate subdirectories of the hard link directory tree provide a multi-level hash index, and the computer instructions, when executed by the data processor, search the hard link directory tree given an inode number of the specified regular file having multiple hard links by hashing the inode number to produce a character string and then using the character string to search for the file name of one of the lower-level subdirectories and then searching said one of the lower-level subdirectories to find a file name of the hard link database file corresponding to the specified regular file having multiple hard links.

18. A file server comprising:
data storage containing a file system;
a data processor coupled to the data storage for access to files in the file system; and
non-transitory computer readable storage medium coupled to the data processor and storing computer instructions, and the file system including a hierarchy of directories and regular files that are not directories, the directories containing records of hard links to the regular files, each of some of the regular files having multiple hard links, each of the hard links including a respective file name, and the data storage containing a hard link database, the hard link database including hard link database files, there being a one-to-one correspondence between said each of the regular files having multiple hard links and each of the hard link database files, and each of the hard link database files containing one or more records of addressing information for addressing one or more of the hard links to the corresponding one of the regular files having multiple hard links, each hard link database file of the hard link database being organized in a directory format, each hard link database file of the hard link database being inaccessible to a user of the data storage, and each regular file in the file system contains an attribute providing addressing information for addressing the record of one hard link to each regular file in the file system, and each hard link database file contains records for hard links other than the one hard link to the corresponding regular file addressed by the addressing information provided by the attribute contained in the corresponding regular file, and the addressing information in each record of each hard link database file includes an inode number and a directory cookie, and the inode number and the directory cookie are encoded in a character string in said each record of each hard link database file, and the hard link database files are directories, and the computer instructions, when executed by the data processor, perform the steps of:

(a) maintaining the one-to-one correspondence between said each of the regular files having multiple hard links and said each of the hard link database files by adding and deleting corresponding hard link database files in the hard link database and invoking file system manager directory access routines for adding and deleting records in the corresponding hard link database files in response to adding and removing multiple hard links to regular files in the file system; and (b) performing a reverse lookup of parent directories storing records of hard links to a specified regular file having multiple hard links by determining the number of hard links from the attribute of the specified regular file, based on the number of hard links, invoking file system manager directory access routines to access the corresponding one of the hard link database files to read addressing information from records in the corresponding one of the hard link database files, and to use the addressing information read from the records in the corresponding one of the hard link database files to address the records of hard links to the specified regular file having multiple hard links.

19. The file server as claimed in claim 18, wherein the hard link database files are leaf nodes in a hard link database directory tree, each hard link database file has a respective file name in the hard link database directory tree, and the respective file name of each hard link database file is a character string encoding an inode number of the corresponding regular file having multiple hard links, and the computer instructions, when executed by the data processor, search the hard link database to find the hard link database file corresponding to the specified regular file having multiple hard links by searching the hard link database directory tree to find the file name of the hard link database file corresponding to the specified regular file having multiple hard links.

20. The method as claimed in claim 18, wherein the hard link database includes a hard link database directory tree, the hard link database files are leaf nodes in the hard link database directory tree, the hard link database directory tree includes a root directory and lower-level subdirectories, and the lower-level subdirectories have file names that encode different hash values of the inode numbers of the regular files in the file system so that the root directory and intermediate subdirectories of the hard link directory tree provide a multi-level hash index, and the computer instructions, when executed by the data processor, search the hard link directory tree given an inode number of the specified regular file having multiple hard links by hashing the inode number to produce a character string and then using the character string to search for the file name of one of the lower-level subdirectories and then searching said one of the lower-level subdirectories to find a file name of the hard link database file corresponding to the specified regular file having multiple hard links.

* * * * *